United States Patent [19]
Hirose

[11] Patent Number: 5,710,921
[45] Date of Patent: Jan. 20, 1998

[54] INFORMATION PROCESSING SYSTEM AND WORK FLOW MANAGEMENT METHOD THEREFOR

[75] Inventor: Yoichi Hirose, Kanagawa, Japan

[73] Assignee: Fuji Xerox Co., Ltd., Tokyo, Japan

[21] Appl. No.: 424,645

[22] Filed: Apr. 19, 1995

[30] Foreign Application Priority Data

May 26, 1994 [JP] Japan .................................. 6-136314

[51] Int. Cl.$^6$ ..................................... G06F 9/06
[52] U.S. Cl. ............................................ 395/676
[58] Field of Search ............................ 395/650, 670, 395/672, 673, 676

[56] References Cited

U.S. PATENT DOCUMENTS

| | | | |
|---|---|---|---|
| 3,662,401 | 5/1972 | Collins et al. | 395/676 |
| 4,503,499 | 3/1985 | Mason et al. | |
| 5,301,320 | 4/1994 | McAtee et al. | |
| 5,535,322 | 7/1996 | Hecht | 395/201 |
| 5,640,504 | 6/1997 | Johnson, Jr. | 395/182.02 |

FOREIGN PATENT DOCUMENTS

| | | |
|---|---|---|
| 0 457 684 | 11/1991 | European Pat. Off. |
| 0 577 324 | 1/1994 | European Pat. Off. |

OTHER PUBLICATIONS

Kahn, et al., "Work Flow Management Techniques and Potentiality," Nikkei Information Strategy, P123–P130, Aug. 1993.

Primary Examiner—Thomas M. Heckler
Attorney, Agent, or Firm—Finnegan, Henderson, Farabow, Garrett & Dunner, L.L.P.

[57] ABSTRACT

In a work flow management apparatus of the present invention, a packet of necessary information is given to each step when the step is started, and the step execution result is returned to the information packet from the step. Routing preprocessing unit is provided for adding an information field for determining whether or not the step is to be routed to its subsequent step to the information packet transferred between the person in charge of the step and the system. Routing postprocessing unit is provided for determining whether or not the step is to be routed to its subsequent step based on the information field contents in the information packet from the person in charge of the step.

6 Claims, 23 Drawing Sheets

STEP TABLE ST

| WORK FLOW IDENTIFIER | STEP NUMBER | STEP NAME | PERSON IN CHARGE |
|---|---|---|---|
| 1000 | 1 | DRAWING PREPARATION | JACK |
| 1000 | 2 | DRAWING CHECK | BEN |
| 1000 | 3 | DRAWING CHECK | JOHN |
| 1000 | 4 | DRAWING APPROVAL | BETTY |

EXECUTION ORDER TABLE OT

| WORK FLOW IDENTIFIER | PRECEDING STEP | FOLLOWING STEP |
|---|---|---|
| 1000 | 0 | 1 |
| 1000 | 1 | 2 |
| 1000 | 1 | 3 |
| 1000 | 2 | 4 |
| 1000 | 3 | 4 |
| 1000 | 4 | NULL |

FIG. 8

| FIELD NAME | FIELD VALUE |
|---|---|
| PERSON IN CHARGE | "JACK" |
| JOB NAME | "DRAWING PREPARATION" |
| OUTLINE | "PREPARE DRAWING" |
| COMMENT | "PLEASE COMPLETE THE JOB UNTIL 15TH DAY" |
| DATE | DECEMBER 24, 1993 |
| CURRENT STEP | 1 |
| STEP-1-2 | TRUE |
| STEP-1-3 | TRUE |

FIG. 9

| FIELD NAME | FIELD VALUE |
|---|---|
| PERSON IN CHARGE | "JACK" |
| JOB NAME | "DRAWING PREPARATION" |
| OUTLINE | "PREPARE DRAWING" |
| COMMENT | "PLEASE COMPLETE THE JOB UNTIL 15TH DAY" |
| DATE | DECEMBER 24, 1993 |
| CURRENT STEP | 1 |
| DRAWING 1 | (IN FACT, DRAWING IS ENTERED) |
| STEP-1-2 | TRUE |
| STEP-1-3 | FALSE |

FIG. 10

| STEP-1-2 | |
|---|---|
| RULE | IF [QUOTATION > 10000]<br>THEN<br>    TRUE;<br>ELSE<br>    FALSE;<br>ENDIF |

FIG. 11

| STEP-1-3 | |
|---|---|
| RULE | IF [QUOTATION ≤ 10000]<br>THEN<br>    TRUE;<br>ELSE<br>    FALSE;<br>ENDIF |

FIG. 12

| FIELD NAME | FIELD VALUE |
|---|---|
| PERSON IN CHARGE | "JACK" |
| JOB NAME | "DRAWING PREPARATION" |
| OUTLINE | "PREPARE DRAWING" |
| COMMENT | "PLEASE ENTER QUOTATION" |
| DATE | DECEMBER 24, 1993 |
| CURRENT STEP | 1 |
| QUOTATION | |
| STEP-1-2 | TRUE |
| STEP-1-3 | TRUE |

FIG. 13

| FIELD NAME | FIELD VALUE |
|---|---|
| PERSON IN CHARGE | "JACK" |
| JOB NAME | "DRAWING PREPARATION" |
| OUTLINE | "PREPARE DRAWING" |
| COMMENT | "PLEASE ENTER QUOTATION" |
| DATE | DECEMBER 24, 1993 |
| CURRENT STEP | 1 |
| DRAWING 1 | (IN FACT, DRAWING IS ENTERED) |
| QUOTATION | 12000 |
| STEP-1-2 | TRUE |
| STEP-1-3 | TRUE |

FIG. 16

| ATTRIBUTE NAME | ATTRIBUTE VALUE |
|---|---|
| TYPE | START |
| NAME | START |
| PERSON IN CHARGE | --- |
| STATE | --- |

FIG. 17

| ATTRIBUTE NAME | ATTRIBUTE VALUE |
|---|---|
| TYPE | STANDARD |
| NAME | ACCEPT REQUEST |
| PERSON IN CHARGE | SECRETARIAT |
| STATE | --- |

FIG. 18

| ATTRIBUTE NAME | ATTRIBUTE VALUE |
|---|---|
| TYPE | STANDARD |
| NAME | REVIEW 1 |
| PERSON IN CHARGE | SALES DEPT. |
| STATE | --- |

FIG. 19

| ATTRIBUTE NAME | ATTRIBUTE VALUE |
|---|---|
| TYPE | STANDARD |
| NAME | REVIEW 2 |
| PERSON IN CHARGE | PLANNING DEPT. |
| STATE | --- |

FIG. 20

| ATTRIBUTE NAME | ATTRIBUTE VALUE |
|---|---|
| TYPE | STANDARD |
| NAME | REVIEW 2 |
| PERSON IN CHARGE | DESIGN DEPT. |
| STATE | --- |

FIG. 21

| ATTRIBUTE NAME | ATTRIBUTE VALUE |
|---|---|
| TYPE | AUTOMATIC |
| NAME | ACCEPTANCE ? |
| PERSON IN CHANGE | --- |
| STATE | --- |
| SCRIPT | IF ($VOTE ≥ 2)<br>THEN<br>   {$PACKET. {ROUTINGINFO}  {CHANGE DESIGN}=TRUE;<br>    $PACKET. {ROUTINGINFO}  {REJECT REQUEST}=FALSE;<br>ELSE<br>   {$PACKET. {ROUTINGINFO}  {CHANGE DESIGN}=FALSE;<br>    $PACKET. {ROUTINGINFO}  {CHANGE DESIGN}=TRUE;} |

FIG. 22

| ATTRIBUTE NAME | ATTRIBUTE VALUE |
|---|---|
| TYPE | STANDARD |
| NAME | CHANGE DESIGN |
| PERSON IN CHARGE | DESIGN LEADER |
| STATE | --- |

FIG. 23

| ATTRIBUTE NAME | ATTRIBUTE VALUE |
|---|---|
| TYPE | STANDARD |
| NAME | APPROVE |
| PERSON IN CHARGE | DESIGN DEPT HEAD |
| STATE | --- |

FIG. 24

| ATTRIBUTE NAME | ATTRIBUTE VALUE |
|---|---|
| TYPE | STANDARD |
| NAME | DISTRIBUTE DESIGN CHANGE |
| PERSON IN CHARGE | SECRETARIAT |
| STATE | --- |

FIG. 25

| ATTRIBUTE NAME | ATTRIBUTE VALUE |
|---|---|
| TYPE | STANDARD |
| NAME | REJECT REQUEST |
| PERSON IN CHARGE | SECRETARIAT |
| STATE | --- |

FIG. 26

| ATTRIBUTE NAME | ATTRIBUTE VALUE |
|---|---|
| TYPE | END |
| NAME | END |
| PERSON IN CHARGE | --- |
| STATE | --- |

FIG. 27

| RUN OF REVIEW 1 | |
|---|---|
| RULE | ADD ($PACKET) FIELD {VOTE RESULT}; $PACKET. {VOTE RESULT} = YES; |

FIG. 28

| RUN OF REVIEW 1 | |
|---|---|
| RULE | IF ($PACKET. {VOTE RESULT} = YES) THEN {$VOTE} |

FIG. 34

| ATTRIBUTE NAME | ATTRIBUTE VALUE |
|---|---|
| TYPE | START |
| NAME | START |
| PERSON IN CHARGE | --- |
| STATE | NOT READY |

FIG. 35

| ATTRIBUTE NAME | ATTRIBUTE VALUE |
|---|---|
| TYPE | START |
| NAME | START |
| PERSON IN CHARGE | --- |
| STATE | READY |

FIG. 36

| ATTRIBUTE NAME | ATTRIBUTE VALUE |
|---|---|
| TYPE | START |
| NAME | START |
| PERSON IN CHARGE | --- |
| STATE | RUN |

FIG. 37

| ATTRIBUTE NAME | ATTRIBUTE VALUE |
|---|---|
| TYPE | START |
| NAME | START |
| PERSON IN CHARGE | --- |
| STATE | COMPLETE |

FIG. 38

```
FROM:          WORK FLOW SERVER
WORKFLOW:      DESIGN CHANGE 1234
STEP:          ACCEPT REQUEST
TO:            SECRETARIAT
DESCRIPTION:   TRANSFER DRAWING FOR DESIGN CHANGE TO REVIEWERS
COMMENT:       I REQUEST PART X TO BE MADE 1mm WIDER
```

FIG. 39

| FIELD NAME | FIELD VALUE |
|---|---|
| DRAWING | --- |
| COMMENT | --- |
| ROUTING INFORMATION | REVIEW 1 → TRUE<br>REVIEW 2 → TRUE<br>REVIEW 3 → TRUE |

FIG. 40

| FIELD NAME | FIELD VALUE |
|---|---|
| DRAWING | DRAWING X |
| COMMENT | A REQUEST FOR MAKING PART X 1mm WIDER IS MADE. EXAMINE THE ACCOMPANYING DRAWING AND VOTE FOR OR AGAINST THE REQUEST. |
| ROUTING INFORMATION | REVIEW 1 → TRUE<br>REVIEW 2 → TRUE<br>REVIEW 3 → TRUE |

FIG. 41

```
FROM:         WORK FLOW SERVER
WORKFLOW:     DESIGN CHANGE 1234
STEP:         ACCEPT REQUEST
TO:           SECRETARIAT
DESCRIPTION:  DISCUSS WHETHER OR NOT THE DESIGN CHANGE IS TO
              BE MADE
COMMENT:      REQUEST FOR MAKING PART X 1mm WIDER IS MADE.
              EXAMINE THE ACCOMPANYING DRAWING AND VOTE FOR
              OR AGAINST THE REQUEST
```

FIG. 42

| FIELD NAME | FIELD VALUE |
|---|---|
| DRAWING | DRAWING X |
| COMMENT | |
| ROUTING INFORMATION | |
| VOTE RESULT | |

FIG. 43

| FIELD NAME | FIELD VALUE |
|---|---|
| DRAWING | DRAWING X |
| COMMENT | SALES DEPT AGREE WITH THE REQUEST |
| ROUTING INFORMATION | |
| VOTE RESULT | YES |

FIG. 44
| FIELD NAME | FIELD VALUE |
|---|---|
| DRAWING | DRAWING X |
| COMMENT | PLANNING DEPT WOULD NOT LIKE TO CHANGE THE DESIGN IF POSSIBLE |
| ROUTING INFORMATION | |
| VOTE RESULT | NO |
FIG. 45
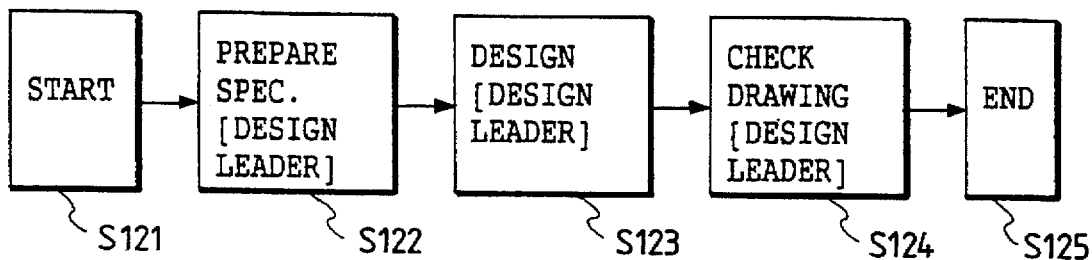
FIG. 46
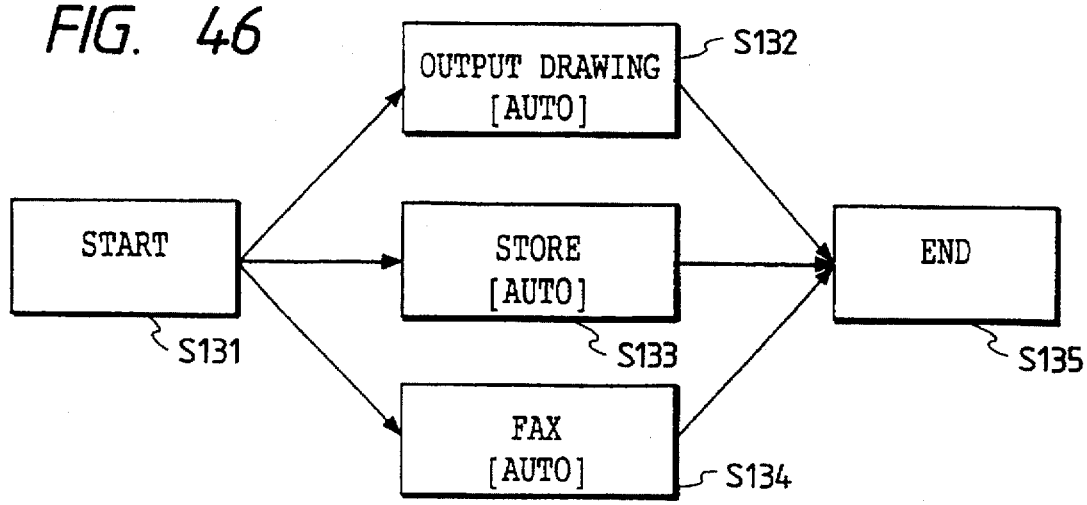

INFORMATION PROCESSING SYSTEM AND WORK FLOW MANAGEMENT METHOD THEREFOR

BACKGROUND OF THE INVENTION

1. Field of the Invention

The present invention relates to an information processing system for defining the order and processing contents of steps concatenated to each other via information and supporting job processing such as information transfer between the steps, and a work flow management method therefor.

2. Description of the Related Art

Hitherto, office automation with computers has been proposed for improving the efficiency of job processing. However, in the conventional job processing, each job process was only automated separately. In other words, linkage between jobs is not considered in the conventional office automation.

Work flow automation is proposed as automation of the linkage between jobs for improving the efficiency and speed of job processing. In the work flow automation, steps executed in conjunction with each other via information is called a work flow and a support system for automating the work flow is called a work flow system.

The work flow system is an information processing system for automating job processing by previously designing and defining rules of information transfer between users in job processing and work to be executed between reception of information and passing it to the next step in a processing environment such as a distributed processing environment in a network.

The work flow system has the following processing functions:

1: edit function for defining job processing flow and job rules;
2: template (defined work flow) management function;
3: notification function for notifying users that information to be processed has been delivered;
4: data base function for managing delivered information;
5: routing function for passing information to the next step in accordance with setup work flow and rules;
6 progress management function for managing job situation; and
7 system management function for maintaining and managing the current work flow being executed.

The work flow system is outlined in Michael D. Kahn and Makoto YASUDA "Work Flow Management Techniques and Potentiality" P123-P130 in August 1993 issue of "Nikkei Information Strategy" Nikkei BP.

When a work flow is defined, it is represented by a graph structure. FIG. 47 is an example of the defined work flow.

In FIG. 47, each node enclosed in a box denotes a working step (hereinafter, referred to "step") which is a job unit. Each arc (arrow) defines a job flow (concatenation, job order and relation); one step followed by another step means that the following step cannot be started unless the preceding step is completed. Also, it means that the following step starts automatically upon completion of the preceding step.

In the work flow, human beings execute actual work in each step and the work flow system manages such a job flow. That is, the work flow system manages the entire job flow in such a manner that whenever one step is completed, the system starts the next step based on a defined work flow.

The function of starting another step upon completion of one step as described above is called a routing function.

Starting the following step when one step is completed is referred to as routing the step to the following step; when control is not passed to the following step, it is referred to as no routing. In the document listed above, details of the routing method are not given.

In a condition in which every step is followed by only one step as shown in FIG. 47, routing is simple; when the preceding step is completed, automatically the step may be routed to the following step for starting it. However, only simple job processing can be defined in such a work flow. Normally, a work flow is often defined in which the flow branches and the branch again merges with the main flow, as shown in FIG. 48.

In such a complicated work flow, it is necessary to determine how one step is routed to the following steps. That is, when one step branches to the following steps, it may be routed to:

1 all of the following steps;
2 only one of the following steps; or
3 some of the following steps.

The work flow system can automatically perform routing in the simple work flow as shown in FIG. 47 after completion notification of the preceding step. However, to cause the work flow system to perform routing at a branch in the work flow as shown in FIG. 48, means for enabling the work flow system to easily determine whether or not routing is to be performed is desired.

As an example of the means, when a work flow is started, one step from a number of branch steps to be routed to can be predetermined. However, such a standardized method in which a routing way is predetermined cannot make a flexible determination of changing routing in response to a user request such as the user processing result in the preceding step.

It would be very convenient that the user in the preceding step can determine routing to the following steps instead of causing the work flow system to determine routing. Hitherto, this means has not been provided.

For the work flow containing branches as described above, how to determine job starting at the merging of steps becomes significant.

That is, when the work flow has steps each followed only by one step as shown in FIG. 47, if a completion notification of the preceding step is given, immediately the step can be routed to the following step for execution. However, in branches as shown in FIG. 48, all or some steps after branch may be executed. In this case, routing cannot be executed by a simple method waiting for all the preceding steps to be completed before the following step is started, because an unexecuted step will not be completed.

SUMMARY OF THE INVENTION

It is therefore an object of the invention to provide an information processing system which can easily determine routing even for a complicated work flow containing branches and can also determine routing flexibly in response to the job results and user requests.

In order to accomplish the above object, an information processing system includes: dividing unit for dividing a job to be processed in order into a plurality of working steps including a first working step and a second working step following to the first working step; defining unit for defining an order of the plurality of working steps and the process contents of each step to support the job; giving unit for giving a necessary information packet to each of the plurality of working steps; selecting unit for selecting the information packet containing a process result of each of the plurality of working steps from each of the steps; adding unit for adding an information field for determining whether or not the step is to be routed to its subsequent step to the information packet transferred between the steps; and adding unit for adding an information field to the packet information, transferred among the plurality of steps, of the first working step, the information field determining whether or not the second working step following to the first working step is to be perform; and routing unit for determining whether or not the second working step following to the first working step is subjected to perform based on a content of the added information field in the information packed added to the first working step.

Thus, in the present invention, even if the current step branches, the added information fields can be used to easily determine whether or not the step is to be routed to each of the following steps. If the person in charge of the step describes information indicating whether or not the step is to be routed to its subsequent step in the added information field, he or she can specify whether or not the step is to be routed to its subsequent step. That is, the person in charge of the step can specify routing to its subsequent steps for flexible routing as he or she requires.

BRIEF DESCRIPTION OF THE DRAWINGS

In the accompanying drawings:

FIG. 8 is a drawing showing an example of a data packet sent to the person in charge of step 1 in the embodiment in FIG. 5;

FIG. 9 is a drawing showing an example of a data packet of the job result from the person in charge of step 1 in the embodiment in FIG. 5;

FIG. 10 is a drawing showing an example of a rule defined for concatenation from step 1 to step 2 in the embodiment in FIG. 5;

FIG. 11 is a drawing showing an example of a rule defined for concatenation from step 1 to step 3 in the embodiment in FIG. 5;

FIG. 12 is a drawing showing another example of a data packet sent to the person in charge of step 1 in the embodiment in FIG. 5;

FIG. 13 is a drawing showing another example of a data packet of the job result from the person in charge of step 1 in the embodiment in FIG. 5;

FIG. 16 is a drawing showing an example of attribute values when step START in the embodiment in FIG. 15 is defined;

FIG. 17 is a drawing showing an example of attribute values when step ACCEPT REQUEST in the embodiment in FIG. 15 is defined;

FIG. 18 is a drawing showing an example of attribute values when step REVIEW 1 in the embodiment in FIG. 15 is defined;

FIG. 19 is a drawing showing an example of attribute values when step REVIEW 2 in the embodiment in FIG. 15 is defined;

FIG. 20 is a drawing showing an example of attribute values when step REVIEW 3 in the embodiment in FIG. 15 is defined;

FIG. 21 is a drawing showing an example of attribute values when step ACCEPTANCE? in the embodiment in FIG. 15 is defined;

FIG. 22 is a drawing showing an example of attribute values when step CHANGE DESIGN in the embodiment in FIG. 15 is defined;

FIG. 23 is a drawing showing an example of attribute values when step APPROVE in the embodiment in FIG. 15 is defined;

FIG. 24 is a drawing showing an example of attribute values when step DISTRIBUTE DESIGN CHANGE in the embodiment in FIG. 15 is defined;

FIG. 25 is a drawing showing an example of attribute values when step REJECT REQUEST in the embodiment in FIG. 15 is defined;

FIG. 26 is a drawing showing an example of attribute values when step END in the embodiment in FIG. 15 is defined;

FIG. 27 is a drawing showing an example of a rule when the state of the step REVIEW 1 in the embodiment in FIG. 15 is "run";

FIG. 28 is a drawing showing an example of a rule when the state of the step REVIEW 1 in the embodiment in FIG. 15 is "complete";

FIG. 34 is a drawing showing an example of attribute values when step START in the embodiment in FIG. 15 is registered;

FIG. 35 is a drawing showing an example of attribute values when step START in the embodiment in FIG. 15 is started;

FIG. 36 is a drawing showing an example of attribute values when step START in the embodiment in FIG. 15 is in the "run" state;

FIG. 37 is a drawing showing an example of attribute values when step START in the embodiment in FIG. 15 is in the "complete" state;

FIG. 38 is a drawing showing an example of a notification to the person in charge of step ACCEPT REQUEST in the embodiment in FIG. 15;

FIG. 39 is a drawing showing an example of an information packet given to the person in charge when step ACCEPT REQUEST in the embodiment in FIG. 15 is started;

FIG. 40 is a drawing showing an example of an information packet sent from the person in charge of step ACCEPT REQUEST in the embodiment in FIG. 15 upon completion of the step;

FIG. 41 is a drawing showing an example of a notification to the person in charge of step REVIEW 1 in the embodiment in FIG. 15;

FIG. 42 is a drawing showing an example of an information packet given to the person in charge when step REVIEW 1 in the embodiment in FIG. 15 is started;

FIG. 43 is a drawing showing an example of an information packet sent from the person in charge of step REVIEW 1 in the embodiment in FIG. 15 upon completion of the step;

FIG. 44 is a drawing showing an example of an information packet sent from the person in charge of step REVIEW 2 in the embodiment in FIG. 15 upon completion of the step;

FIG. 45 is a drawing showing an example of a subflow started in step CHANGE DESIGN in the embodiment in FIG. 15;

FIG. 46 is a drawing showing an example of a subflow started in step DISTRIBUTE DESIGN CHANGE in the embodiment in FIG. 15;

DETAILED DESCRIPTION OF THE INVENTION

Referring now to the accompanying drawings, the preferred embodiments of an information processing system according to the invention will be described as follows.

Figure 2:
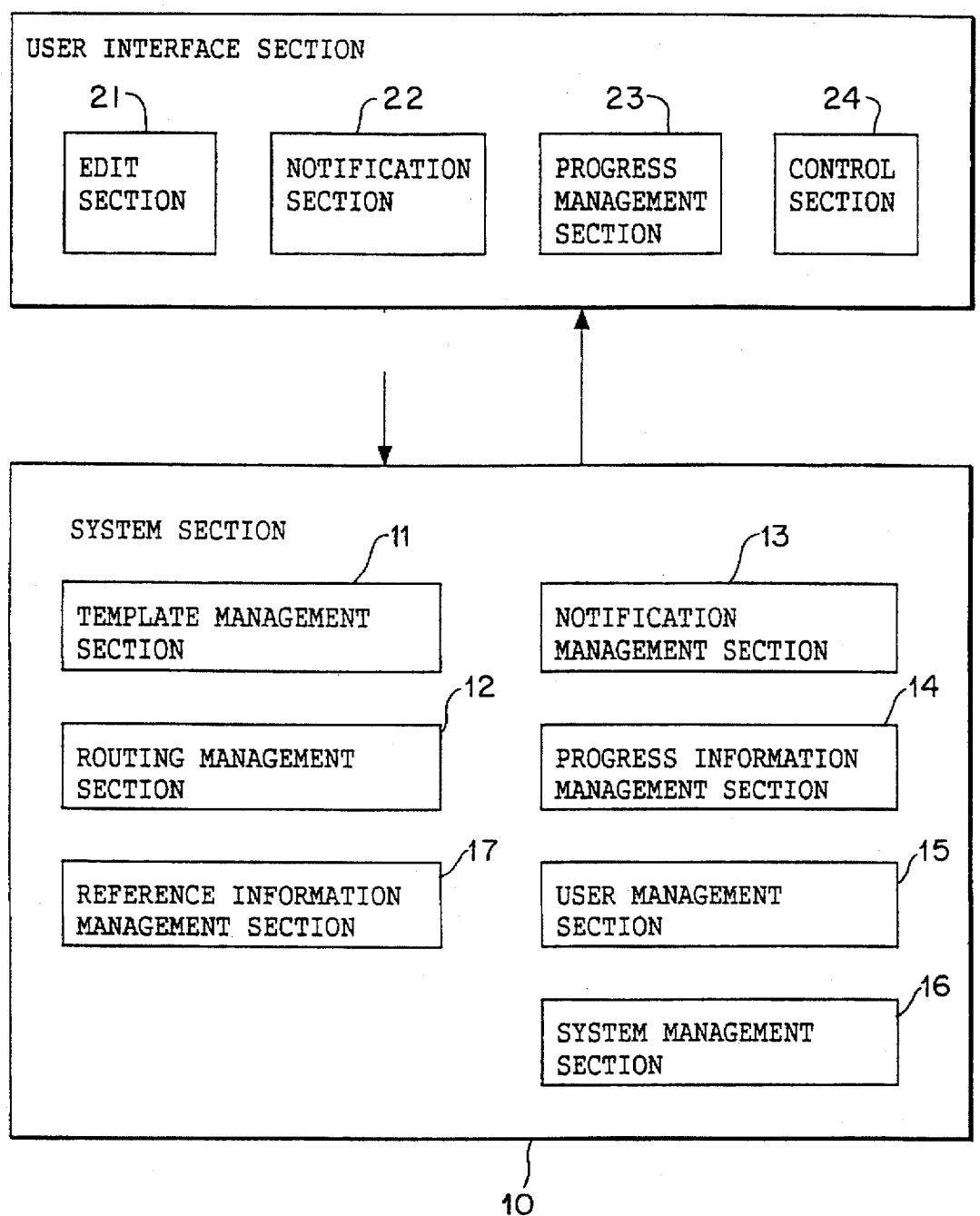
FIG. 2 is a block diagram showing an outline of an information processing system of the invention.

FIG. 2 is a functional block diagram showing an outline of an information processing system of the invention. The information processing system has the configuration of the above-mentioned work flow system. It includes a system section 10 and a user interface section 20. It also manages and supports a work flow, and provides a job environment for supporting processing by a person in charge of each step.

The system section 10 can be made of, for example, a server containing a file management system. The user interface section 20 can be made of, for example, an information processing terminal such as a workstation, and has a display on which the job environment of each step can be displayed. The user interface section 20 can be made common to persons in charge or can be provided for each person in charge. The system section 10 and the user interface section 20 can be connected by a network such as a LAN to construct a distributed processing environment. The system section 10 and the user interface section 20 can be configured as a single unit.

The system section 10 has a template management section 11, a routing management section 12, a notification management section 13, a progress information management section 14, a user management section 15, a system management section 16, and a reference information management section 17. The user interface section 20 includes an edit section 21, a notification section 22, a progress management section 23, and an interface control section 24.

The edit section 21 of the user interface section 20 defines a work flow in accordance with a job processing flow set and input by the user and rules in each job. The template management section 11 of the system section 10 manages the defined work flow (template).

The routing management section 12 of the system section 10 performs routing in accordance with the setup job flow, specification by the person (user) in charge of each step, and predefined rules, as described below in detail.

The notification management section 13 of the system section 10 manages notification of delivery of information to be processed to the user (person in charge). The notification section 22 of the user interface section 20 notifies the user.

The progress information management section 14 of the system section 10 manages information for managing a job condition and a job history. The progress management section 23 of the user interface section 20 uses the information to manage the job condition.

The user management section 15 manages the users in charge of steps. The system management section 16 manages the entire system section 10. The reference information management section 17 manages information required for a job, given to the persons in charge of steps.

[Outline of work flow management by work flow system]

The work flow system manages the transition state of each step in a defined work flow as the following five types:

1: "not ready" state in which the step cannot be started;
2: "ready" state in which the step is ready to be started, waiting for the person in charge to start his or her job;
3: "run" state in which the person in charge is executing his or her job;
4: "complete" state in which the person in charge completes his or her job;
5: "isolation" state in which routing is not performed and the step is isolated from the work flow.

When one step is followed by a number of arcs, namely, branches to a number of steps, a step to which the preceding step is not routed is placed in the "isolation state," as described below.

The work flow system basically performs the following operation in response to the step state transition and repeats the operation for each step for making progress of the work flow:

In the initial state, each step is placed in the "not ready" state. When the work flow is started, the first step is placed in the "ready" state. When the preceding step terminates (enters the "complete" or "isolation" state), the step determined by the routing management section is placed in the "ready" state, as described below.

When the step enters the "ready" state, the person in charge is notified and prompted to start his or her job. When the person in charge gives a start signal to the work flow system, the step enters the "run" state. At the time, the work flow system returns a data packet of information required for executing the job to the person in charge. The data packet has the information required for executing the job and its reference information, and will be hereinafter called simply a packet.

When the person in charge completes the specified job, he sends a completion signal to the work flow system together with a packet including the completed job contents. At the time, the step enters the "complete" state.

When each step terminates, the work flow system determines the next step to be executed and routes to the step. Specifically, the work flow system places the step in the "ready" state and notifies the person in charge for making progress of the work flow.

[Outline of routing method]

As described above, when one step terminates, the next step to be executed is determined by the routing function. In this case, if the preceding step is followed by more than one step like a branch as described above, which of them is to be started or whether or not it is necessary to start all steps have to be determined. In the example, when the work flow is executed, routing is performed dynamically and flexibly as follows:

(1) Routing method by person in charge

As one of routing methods, the example uses a method of making the person in charge of the step preceding a branch specify the next step when a work flow contains branches. That is, in the method, the person in charge selects a step to which the current step is to be routed from among candidates listed for the next step.

To accomplish this method, in the example, a field of information called routing information is added to a packet. The routing information contains, for example, pairs of names of steps following the step and their truth values. Alternatively, pairs of the following arcs (for example, an arc from step 1 to step 2 is represented as step 1-2) and their truth values are described in the routing information.

The truth values in the routing information are initialized by the system, but can be changed by the person in charge. The value "true" means that routing is to be performed; the value "false" means that routing is skipped.

The values initialized by the system becomes default values when the person in charge does not change the routing information. The person in charge uses the received routing information for reference to change the truth values so as to obtain the best result for accomplishing the purpose. Specifically, for the step to which the current step is to be routed, its corresponding truth value in the routing information is set to "true" and for the step to which the current step is not to be routed, its corresponding truth value in the routing information is set to "false," whereby the persons in charge of steps can flexibly and dynamically determine routing during execution of the work flow.

The changed routing information is contained in a packet, which is returned to the work flow system together with a completion signal. The system references the routing information in the packet and checks the truth values corresponding to the subsequent steps, then routes the current step to the steps having the value "true" and skips the steps having the value "false."

(2) Routing method by work flow system

In some cases, it might be wanted for the work flow system to automatically determine routing at a branch rather than the person in charge. However, the work flow system cannot determine routing without any information. The example enables the work flow system to determine routing in the sense by using "promises" such as predefined rules as well as information of the job result in the preceding step. This method is useful to determine routing with another decision of the person in charge as material although it is not desired for the person in charge to directly determine routing.

A routing determination method without using the routing information field is available as one of the routing methods by the work flow system. For example, it is a routing determination method using only rules. That is, when execution (evaluation) of a promise such as a rule results in determination of routing, "true" is set as the truth value of the evaluation result; it results in determination of skipping routing, "false" is set as the truth value of the evaluation result. The work flow system uses the evaluation results to determine whether or not the current step is to be routed to the following steps.

A method of describing the routing information field contents using rules is available as another routing method by the work flow system. According to the method, routing can be determined by referencing the routing information field contents regardless of the routing determination method by the person in charge or the automatic routing determination method by the work flow system. Therefore, the routing determination software can be simplified.

First embodiment

A first embodiment of the invention will be discussed as follows.

In the first embodiment, the person in charge can specify whether or not the current step is routed to the subsequent steps using a routing information field and a work flow system can determine routing according to only rules without using the routing information field.

In the first embodiment, when defining a work flow, the defining person describes rules in steps to which the work flow system is to automatically route the current step. Practically, if one step A is followed by a branch, rules are described for all arcs following the step A.

An example will be discussed in which the next step is automatically selected depending on the amount of money quoted by the person in charge of one step A. In this example, a rule is made that if the quoted amount S is greater than a predetermined reference value R, the step A should be routed only to step B of the following steps B and C, and that if the quoted amount S is less than the predetermined reference value R, the step A should be routed only to step C of the following steps B and C.

An information field for the person in charge to describe the quoted amount is added to a packet passed to the person in charge of the step A. The quoted amount S in the packet information is evaluated according to the defined rule for determining routing between the person in charge sending an end signal to the work flow system and the work flow system starting routing.

Figure 1:
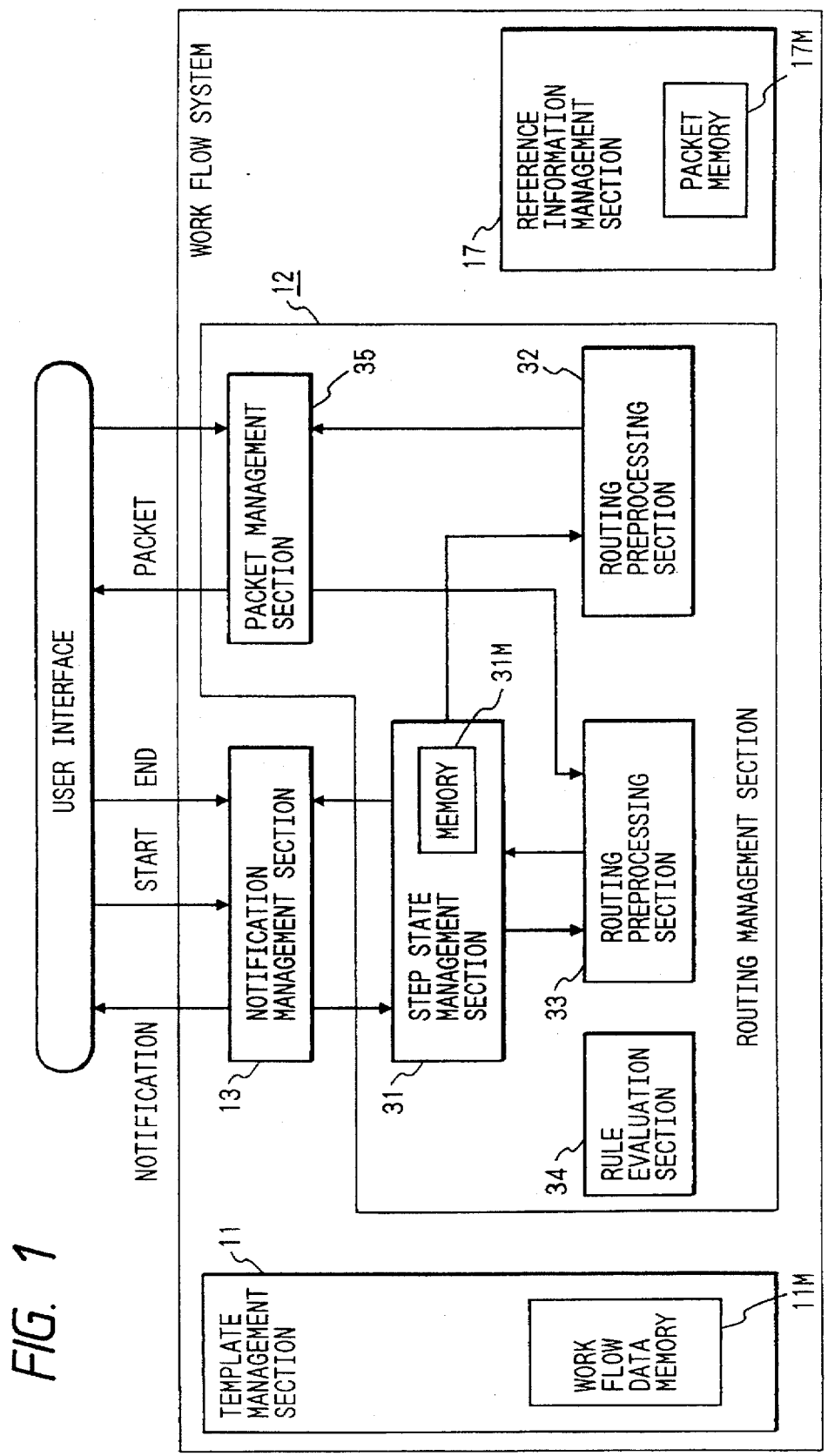
FIG. 1 is a functional block diagram of the main part of a first embodiment of an information processing system according to the invention.

FIG. 1 is a functional block diagram of a work flow management part in an information processing system according to the first embodiment.

A template management section 11 stores data concerning a defined work flow in a memory 11M. The defined work flow is represented by a graph structure having steps (job units) and arcs (arrows) connecting the steps, as described above. Therefore, the data concerning the work flow can be composed of a step table indicating what steps the work flow has and a step execution order table of arc data.

As described above, when the work flow system determines routing at branch arcs, rules are defined for each arc and stored in the memory 11M of the template management section 11.

In this case, a routing management section 12 functionally comprises a step state management section 31, a routing preprocessing section 32, a routing postprocessing section 33, a rule evaluation section 34, and a packet management section 35.

The routing preprocessing section 32 adds a routing information field and an information field required for routing such as a quotation to a packet passed to the person in charge of the next step.

The routing postprocessing section 33 makes an actual routing determination. If a rule is assigned to an arc as a branch is taken, the routing postprocessing section 33 requests the rule evaluation section 34 to evaluate the rule. The rule evaluation section 34 evaluates the rule for each arc stored in the template management section 11 and returns the evaluation result to the routing postprocessing section 33.

The step state management section 31 manages the state transition of each step of the defined work flow registered in the template management section 11 and manages the work flow. It comprises a state data memory 31M of the steps of the defined work flow. The initial state of each step is "not ready."

When the "not ready" to "ready" step state transition is made, the step state management section 31 issues a processing request to the routing preprocessing section 32. At the starting of a work flow, when a work flow start request is received from the person in charge, the state of the first step changes from "not ready" to "ready." During execution of the work flow, the step state management section 31 changes the state of the steps to which the current step is routed from "not ready" to "ready" and places the steps to which the current step is not routed in the "isolation" state in response to a request from the routing postprocessing section 33.

When the "not ready" to "ready" step state transition is made, the step state management section 31 issues a notification request to the notification management section 13, which then notifies the person in charge of the next step and prompts the person to start his or her job.

When the person in charge returns a start signal to the work flow system in response to the notification, the notification management section 13 receives the signal and sends it to the step state management section 31, which then changes the step state from "ready" to "run" in response to it.

The step state management section 31 issues a packet transmission request to the packet management section 35, which then sends a data packet of information required for the person in charge to execute a job to the person. The packet contains the routing information field and other information fields required for routing, added by the routing preprocessing section 32.

The reference information management section 17 manages the packet and has a packet memory 17M. The packet management section 35 uses the information managed in the reference information management section 17 to form a packet for the next routing. It also temporarily stores a packet obtained from the user and sends information field data required for routing to the routing postprocessing section 33.

Before the packet management section 35 sends the packet to the person in charge, the routing preprocessing section 32 adds the fields of routing information, quotation information, etc., to the packet sent to the person in charge, as described above.

The person in charge executes the job based on the packet delivered from the work flow system. Also, the person in charge describes necessary information, such as the truth values of routing information on the subsequent steps and rule evaluation material information, in the information fields added to the packet.

When completing the specified job, the person in charge sends a completion signal to the work flow system together with the packet in which the job contents of the person in charge are set containing the described routing information and job result information. At the time, the step state management section 31 changes the state of the step from "run" to "complete."

When the "run" to "complete" step state transition is made, the step state management section 31 issues a processing request to the routing postprocessing section 33, which then makes an actual routing determination. That is, if routing information is added, the routing postprocessing section 33 determines the step to which the current step is routed, based on the routing information and notifies the step state management section 31 of the step. If a rule is defined for the arc following the current step, the routing postprocessing section 33 sends the value of the rule evaluation material information field to the rule evaluation section 34 and requests the rule evaluation section 34 to evaluate the rule.

The rule evaluation section 34 performs an evaluation on the rule predefined in the work flow data in the template management section 11, and sends the result to the routing postprocessing section 33, which then determines the step to which the current step is routed, based on the evaluation result from the rule evaluation section 34 and notifies the step state management section 31 of the step.

The step state management section 31 changes the state of the step to which the current step is routed from "not ready" to "ready" and places the step to be skipped in the "isolation" state from the "not ready" state in response to the notification from the routing postprocessing section 33. Then, a similar process is repeated for making progress of the work flow, and when the current step is not followed by any step, the work flow processing is terminated.

Figure 3:
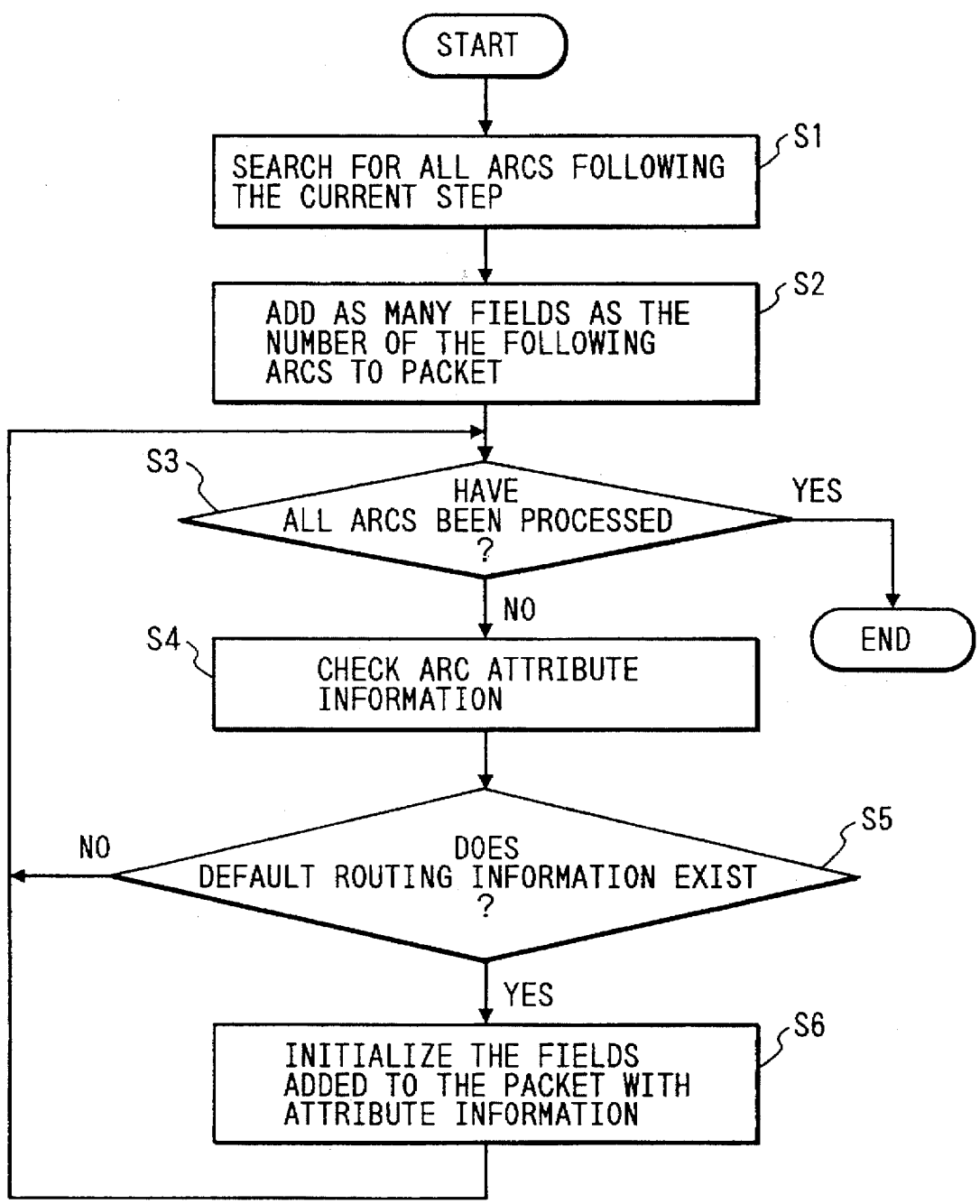
FIG. 3 is a flowchart of an operation example of a routing preprocessing section of the first embodiment of the information processing system according to the invention.

FIG. 3 is a flowchart showing an example of a processing routine S0 executed in the routing preprocessing section 32.

When the "not ready" to "ready" step state transition is made, a processing request comes from the step state management section 31. The routing preprocessing routine S0 in FIG. 3 starts and searches the work flow data for all arcs following the current step (step entering the "ready" state) and adds other necessary information fields at step S1.

Next, as many routing information fields as the number of the following arcs are added to the packet sent to the step at step S2. Next, attribute information of the following arcs are checked at step S4 and whether or not default routing information set by the work flow system exists is determined at decision S5. If the default routing information exists, the added routing information fields are initialized with the routing information at step S6.

If it is determined that no default routing information exists at decision S5 or step S6 is completed, control goes to step S3 at which whether or not steps S4–S6 have been executed for all the following arcs is determined. If not, steps S4–S6 are repeated. If steps S4–S6 have been executed for all the following arcs, the routing preprocessing routine is terminated.

Figure 4:
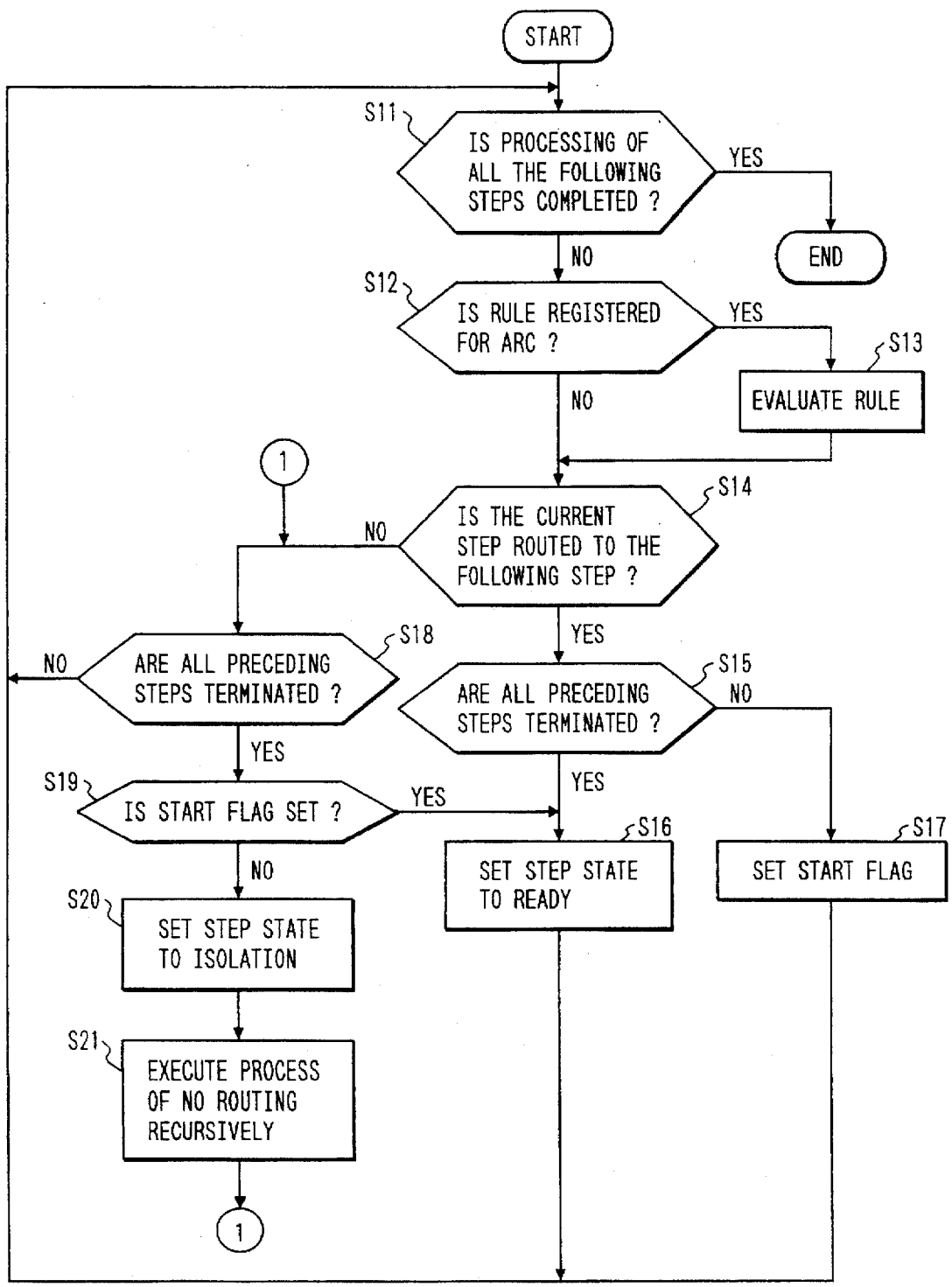
FIG. 4 is a flowchart of an operation example of a routing postprocessing section of the first embodiment of the information processing system according to the invention.

FIG. 4 is a flowchart showing an example of processing executed in the routing postprocessing section 33. When the "run" to "complete" step state transition is made, a processing request comes from the step state management section 31. The routing postprocessing routine S10 in FIG. 4 starts.

First, whether or not the current step whose state changes from "run" to "complete" is followed by any step whose processing is not completed is determined at decision S11. If the current step is not followed by any step whose processing is not completed, the routine S10 is terminated.

If the current step is followed by any step whose processing is not completed, whether or not a rule is defined for the arc leading to the following step (BS) is determined at decision S12. If a rule is defined, a rule evaluation request is issued to the rule evaluation section 34 and the contents of the routing information field for rule evaluation in a packet from the current step are also sent to the rule evaluation section 34 for evaluating the rule at step S13. Then, control goes to decision S14.

At decision S14, whether or not the current step is to be routed to the following step BS is determined in response to the rule evaluation result. When it is determined at decision S12 that no rule is defined for the arc, control goes to decision S14 at which the truth value for the arc in the routing information field is referenced and whether or not the current step is to be routed to the following step BS is determined.

When it is determined at decision 14 that the current step is to be routed to the following step BS, control goes to decision S15 at which, assuming that a number of the preceding steps are concatenated to the following step BS by the arc, whether all the preceding steps are terminated is determined; if the preceding step is placed in the "complete" or "isolation" state, the step is determined to be terminated.

When it is determined at decision S15 that all the preceding steps are terminated, a request for changing the state of the following step BS from "not ready" to "ready" is issued to the step state management section 31, and control returns to decision S11. The process is repeated for other steps following the current step.

When it is determined at decision S15 that some of the steps preceding the following step BS are not terminated, a start flag is set for the following step BS at step S17 without issuing a request for changing the state of the following step BS from "not ready" to "ready." Control returns to decision S11 and the process is repeated for other steps following the current step.

If it is determined at decision S14 that the current step is not routed to the following step BS, control goes to decision S18 at which whether all steps preceding the following step BS to which the current step is not routed are terminated is determined. If the preceding step is placed in the "complete" or "isolation" state, the step is determined to be terminated, as described above.

When it is determined at decision S18 that some of the steps preceding the following step BS to which the current step is not routed are not terminated, control returns to decision S11 and the process is repeated for other steps following the current step.

When it is determined at decision S18 that all the steps preceding the following step BS to which the current step is not routed are terminated, control goes to decision S19 at which whether or not a start flag is set for the following step BS is determined. If the start flag is set, control goes to step S16 at which the following step BS is placed in the "ready" state. Then, control returns to S11.

That is, the condition in which the start flag is set at decision S19 indicates that a step different from the current step is determined to be routed to the following step BS to which the current step is not routed and that the routing is pending. Since it is already determined at decision S18 that all the steps preceding the following step BS are terminated, the routing to the following step BS is enabled. Thus, control goes to step S16 at which the step is placed in the "ready" state.

When it is determined at decision S19 that the start flag is not set, control goes to step S20 at which the following step BS is placed in the "isolation" state. Next, control goes to step S21 and steps S18 to S20 are executed for the step following the following step BS. Thus, steps S18 to S20 are executed recursively for the steps following the step placed in the "isolation" state. Then, control returns to decision S11.

A drawing preparation processing flow will be discussed as a first specific example of a work flow.

Figures 5, 6, 7:
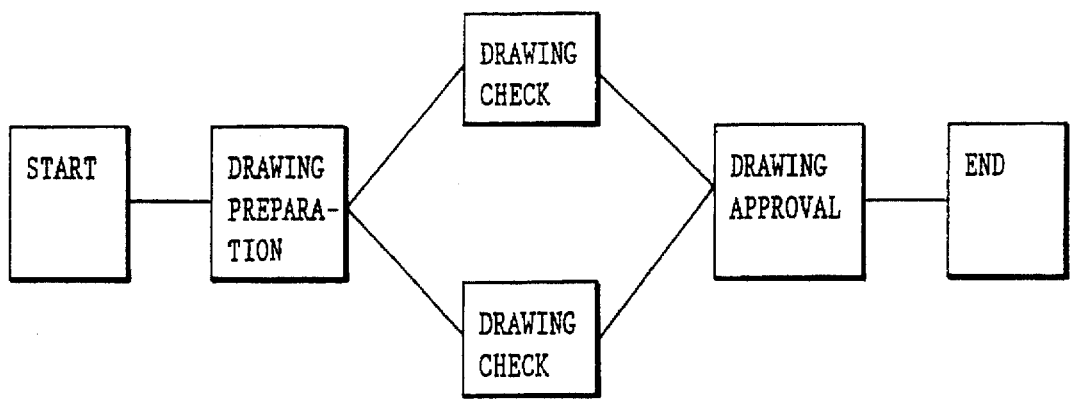
FIG. 5 is a drawing showing a work flow example to which the first embodiment of the information processing system according to the invention is applied.
FIG. 6 is a drawing showing an example of data concerning steps making up a work flow of the embodiment in FIG. 5.
FIG. 7 is a drawing showing an example of data representing concatenation of steps making up the work flow of the embodiment in FIG. 5.

FIG. 5 is a directed graph of the drawing preparation processing flow example. The drawing preparation processing work flow includes step 1 "drawing preparation," steps 2 and 3 "drawing check," and step 4 "drawing approval." It is defined as a work flow in which step 1 branches to step 2 or 3 and step 2 or 3 merges with step 4.

In the example, data concerning a defined work flow (template) managed in the template management section 11 has a step table ST indicating what steps the work flow includes, as shown in FIG. 6, and an execution order table OT listing step execution order information, as shown in FIG. 7. Preceding and following steps are listed in the execution order table OT using step numbers as step identifiers, thereby describing arcs. In the execution order table OT, step number 0 denotes the start step and step number NULL denotes the end step.

Since the example assumes simultaneous management of a number of work flows, work flow identifiers are assigned to the step table ST and the execution order table OT, and each work flow is identified uniquely by the work flow identifiers. The work flow identifier 1000 in the example denotes the drawing preparation processing work flow.

In the description of the example, the steps numbers becomes the step identifiers. Each step name is a job name indicating the job contents executed in the step. The name of the user executing the job in each step is described under the column "person in charge." Instead of the users, departments in charge such as sales and design departments may be set as persons in charge or role names such as a drawing creator, checker, and approver may be described. When the department names in charge or the role names instead of the user names are described under the column "person in charge," the names of the users in charge are determined in response to the correspondence between the users and departments in charge or the correspondence between the users and role names managed in the user management section 15.

As described above, to manage data flowing on the data flow, various pieces of information required for executing the work flow are contained in a packet, which is passed from one step to another.

A routing determination example using a packet flow on a work flow, change of contents, and information fields in the packet will be discussed using the drawing preparation work flow.

(1) Example of routing determination by person in charge

First, how the person in charge of step 1 determines routing to the following step 2 or 3 will be described.

A starter starts the work flow. At the time, if a message destined for the person in charge of the first step exists, the starter writes its correspondence.

FIG. 8 shows an example of the contents of a packet prepared when step 1 is started and sent to the person in charge of step 1; it includes field names and field values. The field values corresponding to the field names "Person in Charge," "Job Name," and "Outline" are the values defined when the work flow is defined, and are copied by the work flow system from work flow data.

The work flow starting person can use the field named "Comment" as a correspondence field destined for the person in charge of the first step. Once the work flow is started, the "Comment" field is used for communication from the preceding person in charge to the following person in charge.

The field values corresponding to the field names "Date" and "Current Step" are the data on which the packet is transmitted and the step number of the destination, which are added automatically by the work flow system.

When step 1 is placed in the "ready" state in response to the work flow starting by the starter, the work flow system performs routing preprocessing described above. Since two steps of steps 2 and 3 exist downstream from step 1, in the routing preprocessing, two fields "step-1-2" and "step-1-3" for routing are added and the default field value "true" is inserted.

The field "step-1-2" denotes an arc from step 1 to step 2 and the field "step-1-3" denotes an arc from step 1 to step 3. As described above, the field value "true" means that the routing is executed and the field value "false" means that the routing is skipped.

As described above, when a job start signal comes from the person in charge after step 1 enters the "ready" state, the first packet whose contents are as shown in FIG. 8 are sent to the person in charge of step 1.

The person in charge of step 1 knows that his or her job is drawing preparation from the received packet contents, and prepares a drawing. The person in charge adds his or her prepared drawing to the packet. Also, the person in charge inserts a message destined for the person in charge of the next step into the "Comment" field of the packet as required.

The person in charge of step 1 can rewrite the field values of the two routing information fields "step-1-2" and "step-1-3" in the packet for determining routing to the following two check steps 2 and 3. In the example, since the default field value is "true," rewriting the field value is equivalent to indication of skipping the routing.

FIG. 9 shows an example of a packet when the job in step 1 is completed. In the packet in FIG. 9, the person in charge of step 1 instructs routing to step 3 to be skipped.

The packet information fields used by the work flow system, such as "Person in Charge" and "Date", cannot be changed by the person in charge without permission.

When step 1 is completed, the packet in FIG. 9 together with a completion signal is returned to the work flow system. Upon reception of the packet, the work flow system starts routing postprocessing as described above.

The work flow system checks the contents of the received packet and uses the routing information to determine whether or not routing to the following step is executed. In the example, since the value of the field "step-1-2" is true, step 1 is routed to step 2. However, since the field "step-1-3" is false, routing to step 3 is skipped. Since step 1 is routed to step 2, the state of step 2 is set to "ready." Since routing to step 3 is skipped, step 3 is placed in the "isolation" state.

To send a packet to step 2 to which step 1 is routed, the work flow system changes the values of the fields of "Person in Charge," "Job Name," "Outline," etc., and performs routing preprocessing of adding field "step-2-3" to the packet, inserting the default field value "true" into the field, and sending the packet to the person in charge of step 2. However, if the step is followed only by one step like the field "step-2-3," the default field value cannot be rewritten by the person in charge without permission like the fields "Person in Charge" and "Date."

The person in charge of step 2 knows that his or her job is drawing check from the received packet contents, and checks the drawing. After checking it, the person in charge returns the drawing to the packet. Also, the person in charge inserts a message destined for the person in charge of the next step into the "Comment" field of the packet as required.

When the job in step 2 is completed, the packet together with a completion signal is returned to the work flow system, which then changes the state of step 2 from "run" to "complete" in response to the completion signal, and performs routing postprocessing. Since the value of the packet routing information field "step-2-3" is true, the work flow system determines routing to step 4. However, since step 4 is preceded by step 3, the work flow system references not only the state of step 2, but also the state of step 3. The state of step 3 is "isolation" at the time and step 2 enters the "complete" state, thus the work flow system judges that all the steps preceding step 4 are terminated, and executes routing to step 4, as described above.

(2) Example of routing determination in accordance with rule assigned to arc

In this example, when a work flow is defined, a rule is described for an arc at a branch. FIGS. 10 and 11 show rule examples. FIG. 10 is an example of a rule assigned to an arc from step 1 to step 2, wherein if the quoted amount of money calculated in step 1 exceeds 10000 yen, step 1 is routed to step 2 and not routed to step 3; if the quoted amount is equal to or less than 10000 yen, step 1 is routed to step 3 and not routed to step 2.

FIG. 11 is an example of a rule assigned to an arc from step 1 to step 3, wherein if the quoted amount of money calculated in step 1 is equal to or less than 10000 yen, step 1 is routed to step 2 and not routed to step 3; if the quoted amount exceeds 10000 yen, step 1 is routed to step 3 and not routed to step 2.

When routing to step 1 is executed, routing preprocessing is performed to add a "Quotation" field to a packet sent to the person in charge of step 1 in addition to routing information fields "step 1-2" and "step-1-3" related to arcs from step 1 to step 2 and from step 1 to step 3, as shown in FIG. 12.

The person in charge of step 1 prepares a drawing as described above and calculates the quoted amount of money and inserts the amount into the "Quotation" field in the packet as the field value. For example, when the person in charge determines the quoted amount to be 12000 yen, he or she inserts the value 12000 into the field "Quotation." FIG. 13 shows an example of the packet when step 1 is completed.

When the person in charge of step 1 completes the job and gives a signal, the packet shown in FIG. 13 is returned to the work flow system. Upon reception of it, the work flow system then starts routing postprocessing. In this case, since a rule is assigned to the arcs following step 1, instead of checking the truth values of the routing information added to the packet, the work flow system uses the value of the field "Quotation" in the returned packet in FIG. 13 to evaluate all the rules assigned to arc following step 1, and determines routing based on the evaluation results.

As described above, the rule evaluation section 34 evaluates the rules. First, the rule assigned to the arc from step 1 to step 2 is evaluated. In the example, since the value of the field "QUOTATION" in the packet is 12000, the evaluation result becomes "true." Therefore, step 1 is routed to step 2.

Next, likewise, the rule assigned to the arc from step 1 to step 3 is evaluated. In the example, since the value of the field "QUOTATION" in the packet is 12000, the evaluation result becomes "false." Therefore, step 1 is not routed to step 3.

Thus, the work flow system can use the rules predefined for the arcs to dynamically determine routing to the subsequent steps in response to the job result in the preceding step. In this case, the routing information fields need not be referenced.

In the first embodiment, if rules are assigned to arcs, the rules override the routing information fields contained in the packet when routing is determined. However, when the person in charge changes the truth value of the routing information field, the routing information field whose truth value is changed by the person in charge may override the rules.

Second embodiment

A second embodiment of the information processing system of the invention will be discussed.

In the first embodiment, the work flow system determines routing by evaluating the rules defined for the arcs in the routine postprocessing. In the second embodiment, rules are defined for the step state, etc., and a work flow system writes routing truth values resulting from evaluating the rules into routing information fields.

Figure 14:
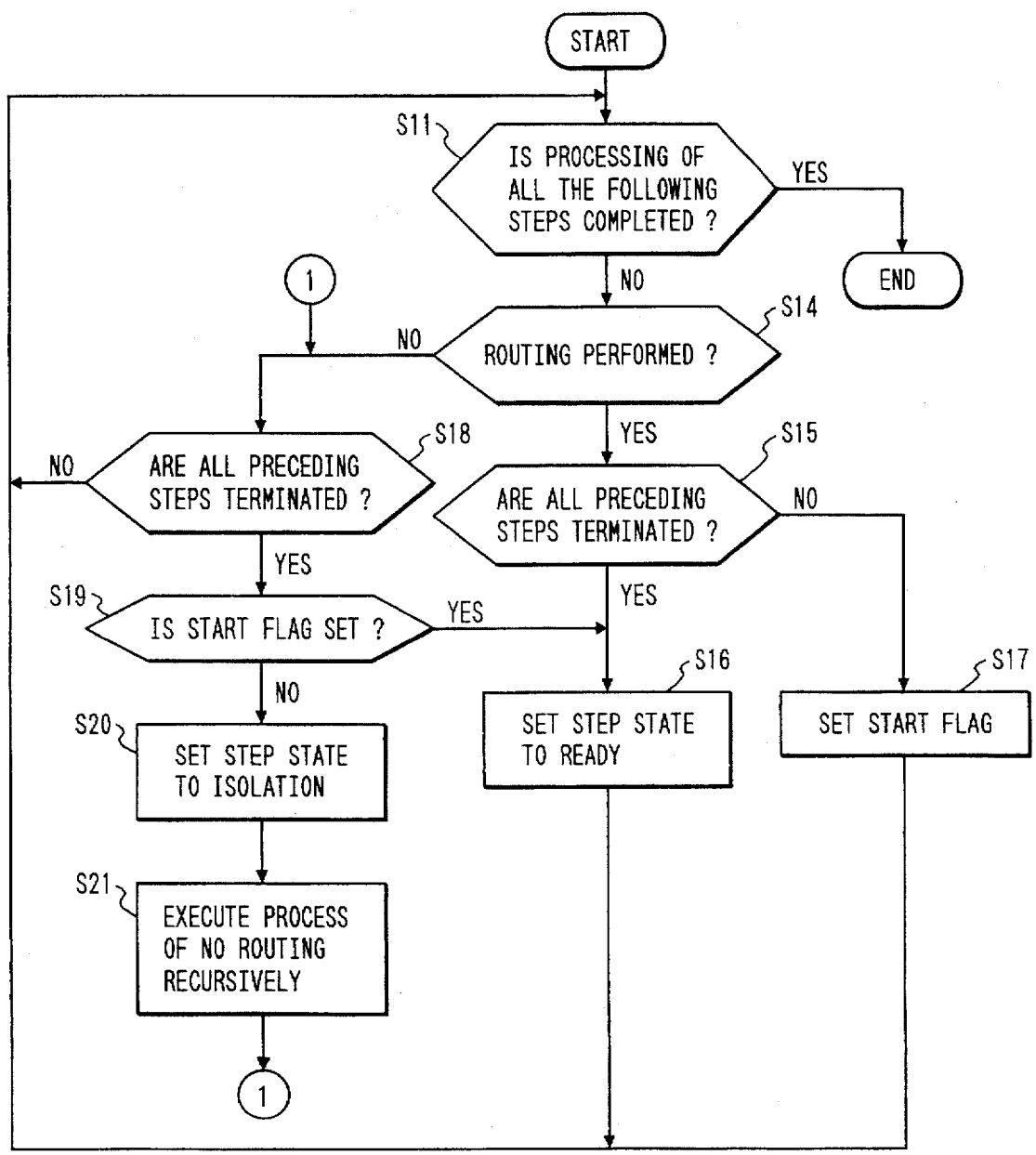
FIG. 14 is a flowchart of an operation example of a routing postprocessing section of a second embodiment of the information processing system according to the invention.

Since rule evaluation need not be executed in routing postprocessing in the second embodiment, a routing postprocessing routine is provided by removing decision S12 and step S13 from the routing postprocessing routine S10 in FIG. 4, enabling control to advance to decision S14 if NO is returned from decision S11, as shown in routine S100 in FIG. 14. Routing postprocessing software can be simplified.

If a rule defined for an arc is always evaluated before the routing postprocessing and the truth values of the routing information fields are rewritten in response to the evaluation result of the rule in the first embodiment, the routing postprocessing software can also be simplified.

A design change process flow will be discussed as a specific example of a work flow to which the second embodiment is applied.

In the work flow example discussed below, routing determination information is generated in accordance with a rule defined for the step state and the truth value for determining whether or not routing is to be executed is entered in a routing information field by an automatic execution step.

In the second embodiment, since a work flow contains jobs more suitable for machines than for human beings, steps for automatically executing jobs without defining the users in charge are created. The steps of this type will be hereinafter referred to as automatic execution steps. When it is necessary to distinguish normal steps executed by the users in charge from the automatic execution steps, the steps of the former type will be referred to as normal steps.

In the example, automatic execution step jobs are defined as jobs executed in the work flow system. When the automatic execution step state becomes "ready," immediately the work flow system changes the state to "run" without issuing any notification. A predefined job is automatically executed in the work flow system and when it is completed, automatically the step is placed in the "complete" state and routing to the next step is performed.

Hardware under the control of the work flow system rather than the work flow system itself may be made to work.

Also possible are steps in which another system not contained in or not under the control of the work flow system is made to execute jobs of which human beings are not in charge. In this case, however, if the system executing the job in the step is assumed to be a person in charge and another system is assigned, it can be handled as a normal step. That is, upon reception of a notification from the work flow system, immediately the assigned system sends a job start signal and starts the job, and when the job is completed, it sends a completion signal to the work flow system under the control of software, whereby machines other than human beings can also be set as persons in charge on a network outside the work flow system.

The second embodiment enables the hierarchical operation of a work flow so that a complicated and large-scaled work flow can be handled more flexibly and in various aspects.

That is, the work flow is composed of a main flow and subflows subordinate to the main flow. Each subflow is linked to one step in the main flow and includes steps into which the job in the main flow step to which the subflow is linked is subdivided, and the linkage between the steps in the subflow is defined by an arc. Linking of a subflow to a step means that the step to which the subflow is linked cannot be terminated unless the subflow is terminated.

More than one subflow can be defined for one step in the main flow, in which case unless all subflows are terminated, the step to which the subflows are linked cannot be terminated.

In the example, when the step to which the subflow is linked enters the "run" state, the person in charge of the step defines a new subflow appropriate for executing his or her job and starts the subflow. The person in charge of the step can also select a subflow to be started from among typical subflow examples previously registered.

All steps in each subflow can also be composed of normal steps or automatic execution steps. Of course, a part of the subflow can also be composed of automatic execution steps.

A subflow is predefined and when the step to which the subflow is linked enters the "ready" state, automatically the subflow can also be started. In this case, more than one subflow to be stated may exist. If all of the subflows are composed of automatic execution steps, a number of jobs automatically started for one step and automatically executed can be easily defined.

Thus, the person in charge of a step defines a subflow and starts it and unless the subflow is terminated, the step is disabled from being terminated, whereby the step to which the subflow is linked needs only to be described and the subflow contents need not be defined in detail in the main work flow, facilitating work flow management.

First, a design change process will be discussed. A typical design change process is executed in the following sequence, for example:

1. Request design change;
2. accept the request;
3. review change
4. determine whether or not design should be changed;
5. change design;
6. approve; and
7. distribute.

First, a design change request occurs. It does not necessarily occur in a design department. Details of design change are formulated in writing and the document is sent to the person in charge of design change in the design department.

When receiving the design change request, the person in charge in the design department must determine whether or not the design change is to be actually made. The person in charge determines reviewers for determining whether or not the change is to be made, and sends the corresponding drawings and change contents to the reviewers, requesting them to determine whether or not the change is to be actually made.

The reviewers check the drawings and change contents, determine whether or not the change is to be actually made, and report the results to the person in charge of totalizing the results.

The person in charge of totalizing the results determines whether or not the change is to be actually made based on the results received from the reviewers. Normally, the change is determined by a majority vote or unanimously.

If the change is determined not to be made, the drawings and change request contents are sent to the design department and a request for actual design change is made. If the design change is determined to be made, the drawings and change request contents are sent to the design department and a request for actual design change is made.

When receiving the drawings and design change request, the design department determines the person in charge of changing the design and an actual design change is made.

Upon completion of the design change, the change contents, etc., put in written form together with changed drawings and the request contents are sent to the design department head.

The design department head approves the received drawings. The approved drawings are distributed to the departments involved.

Figure 15:
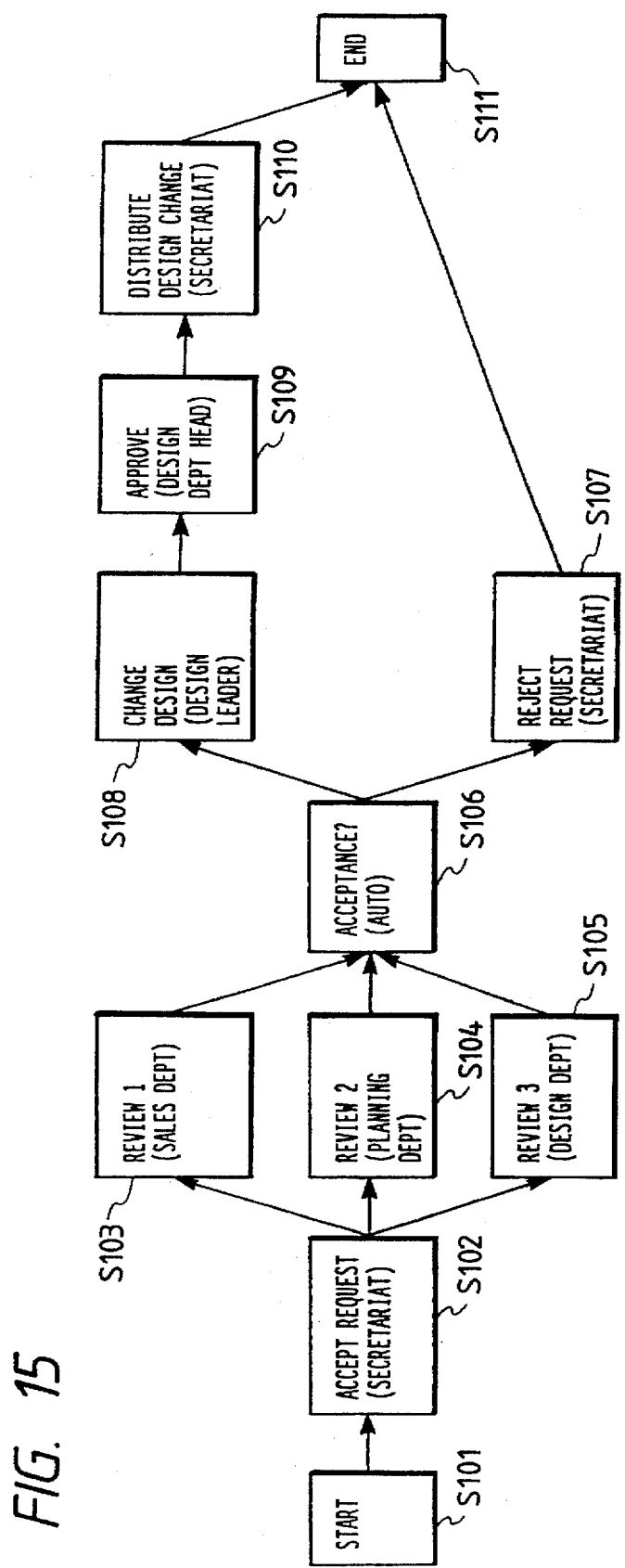
FIG. 15 is a drawing showing a work flow example to which the second embodiment of the information processing system according to the invention is applied.

FIG. 15 shows an example of a work flow defining such a design change process. The function of each step is defined by the work flow defining person as follows:

The START step (S101) denotes the start of the work flow. It corresponds to requesting a design change in actual application. The START step is an automatic execution step.

The ACCEPT REQUEST (S102) step denotes that the person in charge (secretariat) in the design department accepts the design change. The person in charge appends the corresponding drawings to the accepted design change request and distributes them to reviewers.

REVIEW 1, REVIEW 2, and REVIEW 3 steps (S103, S104, S105) are reviewing steps for determining whether or not the design change is to be made in the design department. In the steps, the received drawings and design change request are checked to determine whether or not the design change is to be actually made.

In the ACCEPTANCE? step (S106), the conclusions of the reviewers are totalized and whether or not the design change is to be actually made is determined. In the example, the ACCEPTANCE? step is an automatic execution step in which the work flow system automatically totalizes the conclusions of the reviewers and determines whether or not the design change request is accepted in accordance with a preset rule. If the design change request is accepted, control advances to the CHANGE DESIGN step. If it is not accepted, control advances to the REJECT REQUEST step.

The REJECT REQUEST (S107) step is a step for performing postprocessing when the design change request is not accepted.

The CHANGE DESIGN (S108) step is a step making an actual design change and is sent to the person in charge in the design department. For the actual design change, another work flow, namely, a subflow is started for executing the job in more details.

The APPROVE (S109) step is a step for approving the drawing subjected to design change. The design department head checks the drawing and affixes his or her approval stamp upon the drawing.

The DISTRIBUTE DESIGN CHANGE (Sl10) step is a step for distributing the changed drawing to the departments involved.

After the REJECT REQUEST step and the DISTRIBUTE DESIGN CHANGE step, the work flow goes to the END step (S111).

The work flow is defined by the edit function of the work flow system. The work flow definition is roughly divided into the following three:

1 step preparation;
2 step connection; and
3 rule description

The step preparation also contains rule setting in addition to setting of attributes of TYPE indicating whether the step is a normal or automatic execution step, NAME indicating the job contents in the step, and PERSON IN CHARGE (in the example, department in charge). FIGS. 16 to 26 show the initial attribute values when the steps are defined in the example.

When the steps are prepared, the preceding and following steps are connected along the flow. The entire work flow is prepared by repeating the step preparation and step connection.

A rule is described for each step as required. It can also be defined for an arc, as described above and can also be assigned to each state of a step.

In the example, a field of Boolean variable "vote result" (see FIG. 42) named $vote is added to a packet with a rule of the state "run" of the step REVIEW 1, 2, 3. FIG. 27 shows the rule of the state "run" of the step REVIEW 1, 2, 3. The person in charge of the step REVIEW 1, 2, 3 makes an entry in the field of the variable "vote result."

The work flow system totalizes the vote results with a rule of the state "complete" of the step REVIEW 1, 2, 3. FIG. 28 shows the rule of the state "complete" of the step REVIEW 1, 2, 3. The work flow system determines routing at the following step ACCEPTANCE?, an automatic execution step, based on the total result.

The execution contents at the step ACCEPTANCE? are shown in the attribute SCRIPT in FIG. 21, wherein if the number of votes is equal to or greater than two, the step is routed to the step CHANGE DESIGN and not routed to the step REJECT REQUEST; if the number of votes is less than two, the step is not routed to the step CHANGE DESIGN and routed to the step REJECT REQUEST.

Upon completion of the work flow definition in such a manner, the start of the work flow is declared. Specifically, it includes two stages of registration of the defined work flow in the work flow system and starting of the registered work flow.

Figure 29:
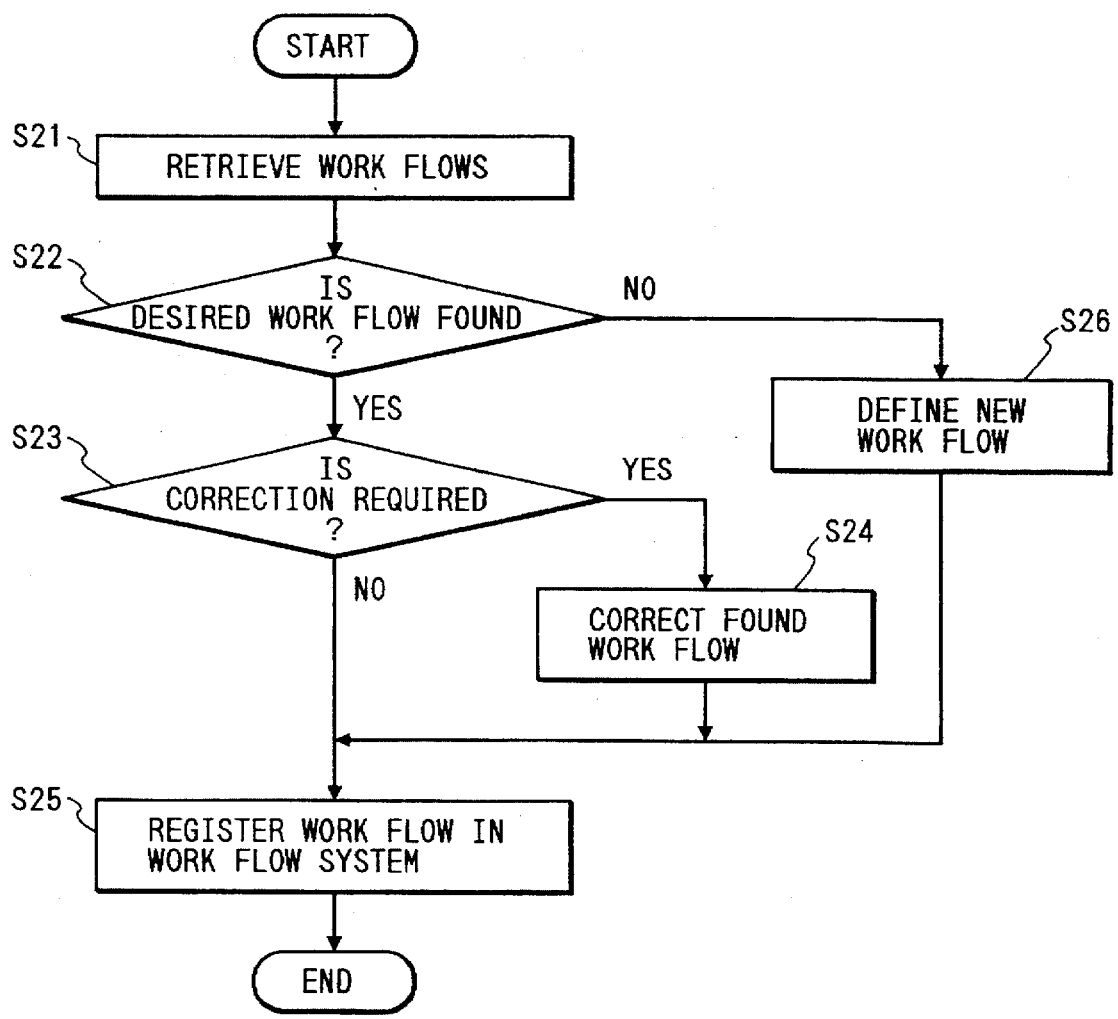
FIG. 29 is a flowchart showing an example of a process flow when a work flow is defined in the information processing system according to the invention.

FIG. 29 is a flowchart of a process of the starter from work flow definition to starting.

First, already registered work flows are retrieved at step S21 and whether or not a work flow fitted to the job to be executed exists among them is determined at step S22. If a fitted work flow exists, whether or not the work flow needs to be corrected is determined at step S23. If the work flow needs to be corrected, it is corrected at step S24. After the correction is completed or if the correction is not required, the work flow is registered in the work flow system at step S25.

If the desired work flow does not exist in the already registered work flows at step S22, a new work flow is defined at step S26, then is registered in the work flow system at step S25.

When the work flow is thus registered in the work flow system, automatically the work flow system starts the work flow. At the beginning, it executes necessary initialization and starts executing the first step.

Figure 30:
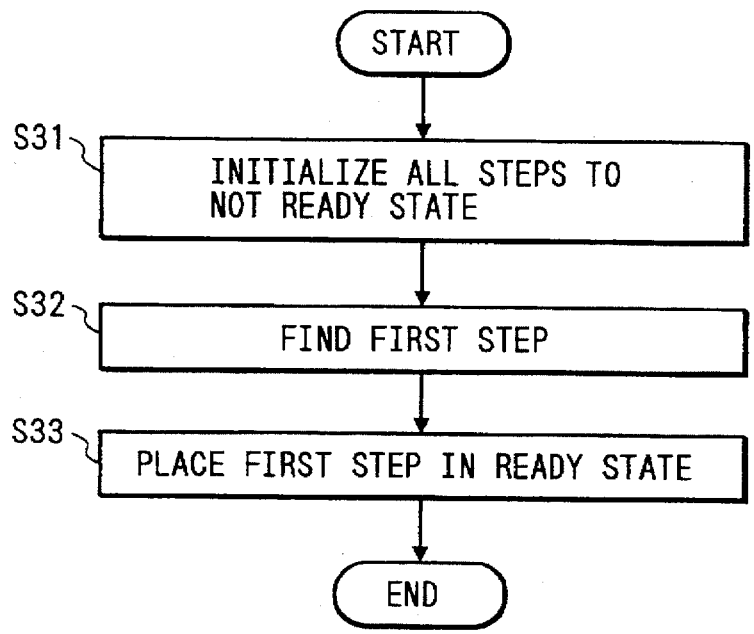
FIG. 30 is a flowchart showing an example of an initialization process flow of a work flow in the information processing system according to the invention.

FIG. 30 is a flowchart of an example of a process routine S30 of the work flow system at initialization. First, all steps in the defined work flow are initialized to the "not ready" state at step S31. Next, the first step is found at step S32 and is placed in the "ready" state at step S33, and the process routine S30 is terminated.

Figure 31:
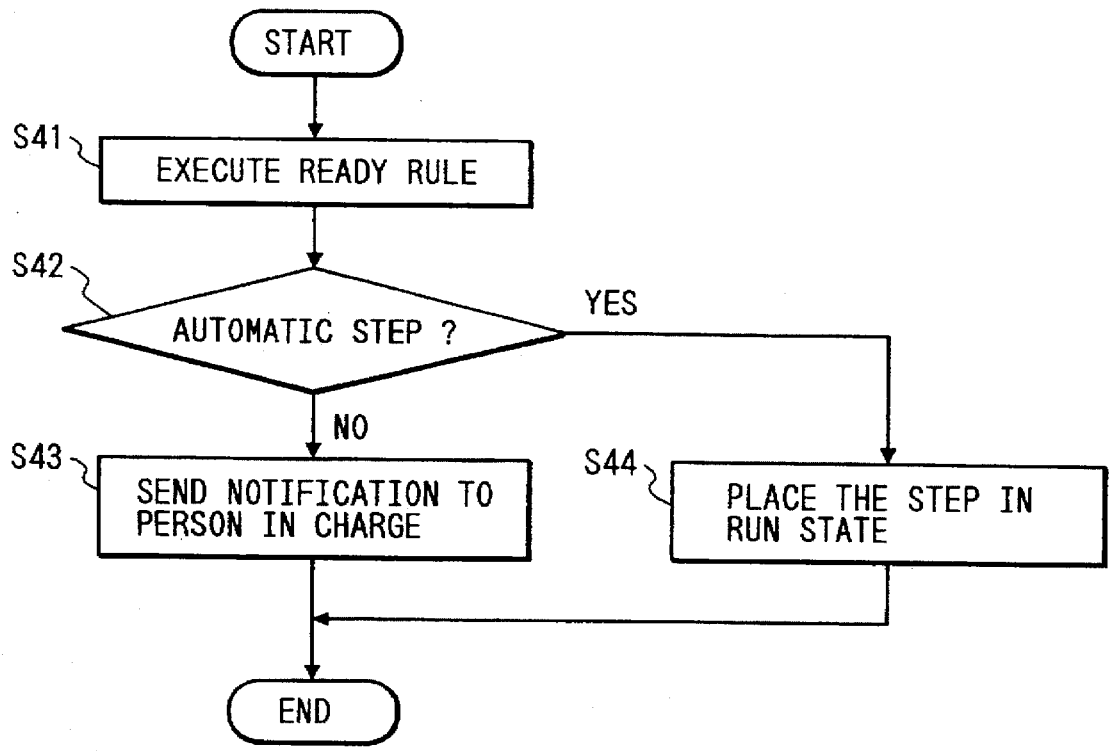
FIG. 31 is a flowchart showing an example of a process flow when the step state becomes "ready" in the information processing system according to the invention.

When the "not ready" to "ready" step state transition is made, the work flow system executes a "ready" state process routine S40. FIG. 31 is a flowchart of an example of the process routine S40.

First, if a "ready" rule is defined for the step entering the "ready" state, the rule is executed at step S41. Upon completion of the rule execution, whether or not the step is an automatic execution step is determined at decision S42. If it is a normal step rather than an automatic execution step, a notification is sent to the person in charge at process S43 and the process routine S40 is terminated.

If the step is determined to be an automatic execution step at decision S42, control goes to decision S44 at which the step is placed in the "run" state without sending a notification, and the process routine S40 is terminated.

Figure 32:
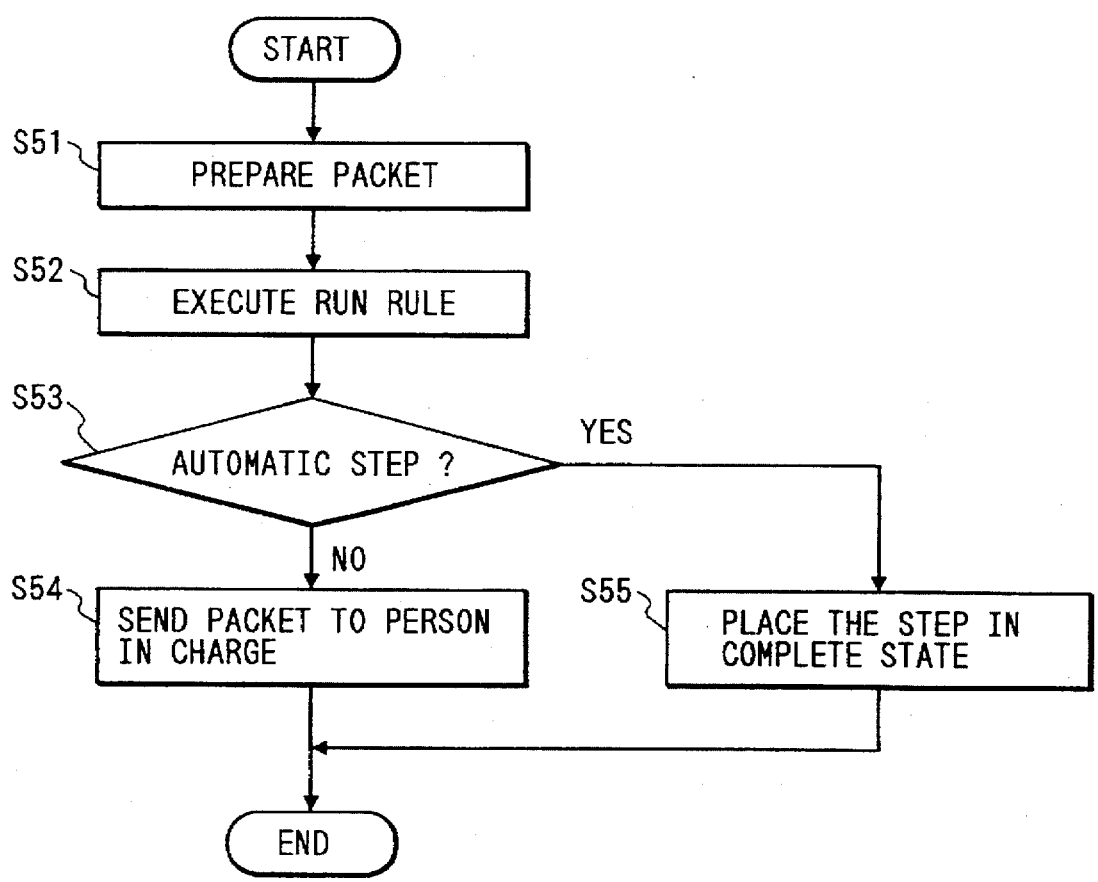
FIG. 32 is a flowchart showing an example of a process flow when the step state becomes "run" in the information processing system according to the invention.

If the "ready" step is a normal step, when the person in charge responds to the notification with declaration of the job starting, the step enters the "run" state. For the automatic execution step, immediately a change is made from "ready" to "run," as described above. When the step enters the "run" state, the work flow system executes a "run" state process routine S50. FIG. 32 is a flowchart of an example of the process routine S50.

First, a packet sent to the person in charge is prepared is determined at step S51. If a "run" state rule is defined for the step, the rule is executed at step S52. Upon completion of the rule execution, whether or not the step is an automatic execution step is determined at decision S53. If it is a normal step rather than an automatic execution step, the packet is sent to the person in charge at process S454 and the process routine S50 is terminated.

If the step is determined to be an automatic execution step at decision S53, control goes to decision S55 at which the step is placed in the "complete" state without sending the packet, and the process routine S50 is terminated.

Figure 33:
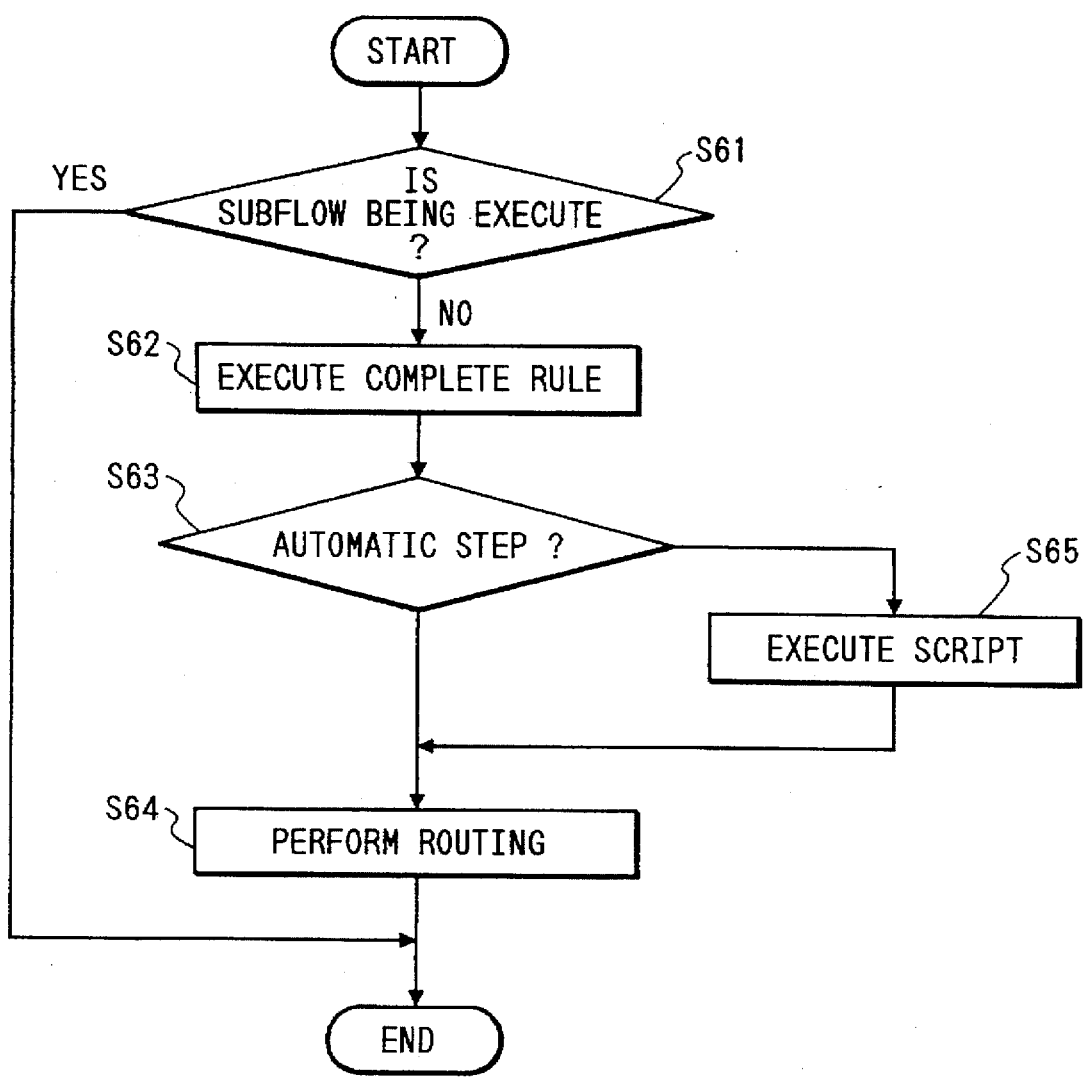
FIG. 33 is a flowchart showing an example of a process flow when the step state becomes "complete" in the information processing system according to the invention.
Figure 47:
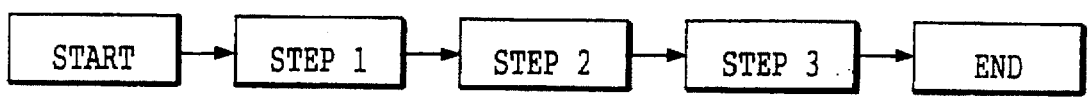
FIG. 47 is a drawing showing an example of a work flow.
Figure 48:
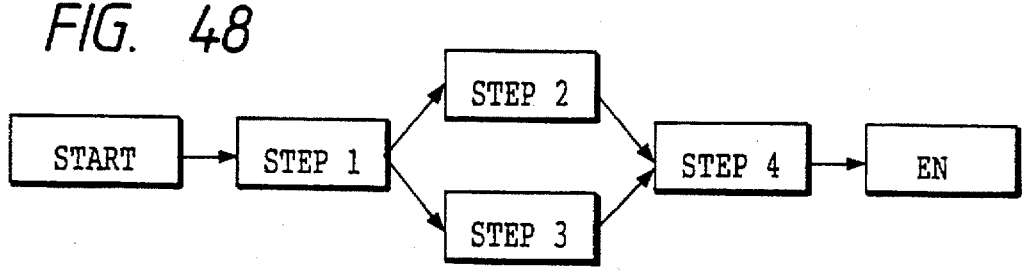
FIG. 48 is a drawing showing another example of a work flow.

If the step is a normal step, when the person in charge declares the end, the "complete" state is entered. However, when a subflow is being executed in the step, even if the person in charge declares the end, the step state does not become "complete." For the automatic execution step, upon completion of the automatic execution job, the work flow system makes the "run" to "complete" step state transition, as described above. When the step state becomes "complete," the work flow system executes a "complete" state process routine S60. FIG. 33 is a flowchart of an example of the process routine S60.

First, whether or not a subflow is being executed is determined at step S61. If it is being executed, the routine S60 is terminated, because when a subflow is started in the step, the step cannot be terminated unless all subflows liked to the step do not terminate, as described above.

When all subflows terminate, control goes to step S62. If a "complete" state rule is defined for the step, the rule is executed at step S62. Upon completion of the rule execution, whether or not the step is an automatic execution step is determined at decision S63. If it is a normal step rather than an automatic execution step, routing (routing postprocessing and routing preprocessing) is performed at step S64, and the process routine S60 is terminated.

If the step is determined to be an automatic execution step at decision S63, control goes to S65 at which a defined script is executed. Then, control goes to step S64 at which routing is performed, and the process routine S60 is terminated. A similar process is repeated until the job in the last step is completed.

Next, a more detailed description will be given by taking the design change work flow as an example.

First, the work flow defining person registers a defined work flow in the work flow system, or work flows are predefined and a person different from the definer registers one of the work flows.

In the example, assume that a person different from the definer registers a predefined work flow in the work flow system. In fact, the person registering the work flow is a person requesting a design change. The design change requester can send a message to the first person in charge of the work flow. This function is a function similar to normal electronic mails. In the example, assume that the work flow starter sends the following message:

"I request part X to be made 1 mm wider"

to the person in charge of the first step (in the example, the person in charge of ACCEPT REQUEST, namely, secretariat).

Upon registration, the work flow system executes initialization. Although steps just defined have no state as shown in FIGS. 16–26, the initialization places all steps in the "not ready" state (for example, see FIG. 34).

When the work flow system completes the initialization, the first step is executed. In the example, the first step is START. Starting the START step means placing the STATE step in the "ready" state (FIG. 35).

When the step enters the "ready" state, normally the work flow system sends a notification to the person in charge of the step. However, START is a special step (a kind of automatic execution step), and immediately changes to the "run" state without sending a notification.

If the step is an automatic execution step, the operation specified at the definition of the step is performed upon the transition to the "run" state. However, START, which is a special step for signaling the start, has no definition. Therefore, no operation is performed and the transition to the "complete" state is made (FIG. 37).

When the START step enters the "complete" state, the work flow system starts routing. In this case, the step is followed only by ACCEPT REQUEST, thus routing to the ACCEPT REQUEST step is only executed.

When the ACCEPT REQUEST step enters the "ready" state, a notification is sent to the person in charge of the step, who receives the notification in a sense like reading an electronic mail. FIG. 38 shows an example of the notification.

When the person in charge receiving the notification sends a start signal to the work flow system, the work flow system responds it with a packet containing information required for executing the job in the step (see FIG. 39). Routing information for determining routing to the three subsequent steps REVIEW 1, REVIEW 2, and REVIEW 3 is added.

The person in charge executes his or her job based on the information in the packet. The job in the ACCEPT REQUEST step is to check the request contents, collect a drawing of the part whose design change is requested, and request the persons in charge of review in the design department to review the design change request. The description concerning the job is defined by the person defining the work flow; it is given as the job contents in the "Description:" field in the example of the notification in FIG. 38. The notification also contains a message from the work flow starter in the "Comment:" field as shown in FIG. 38.

The person in charge of "ACCEPT REQUEST" collects a necessary drawing based on the contents of the "Description:" and "Comment:" fields, and appends the drawing to packet. Since the design change request is applied to the part X, the person in charge finds the drawing of the part X and adds it to the packet.

Next, the persons in charge of reviewing are determined. In the example, three persons in charge of reviewing are defined. Normally, all persons in charge of reviewing vote on the matter under reviewing, thus all the truth values corresponding to the reviewers in the routing information contained in the packet sent to the person in charge of the ACCEPT REQUEST step are initialized to "true" by the work flow system.

For example, if the person in charge of the ACCEPT REQUEST step decides that the reviewers need not be changed, he or she does not change the truth values. Thus, the routing information in the packet is not changed and is returned to the system. At the time, the person in charge describes a comment sent to the reviewers and adds it to the packet. FIG. 40 shows an example of the packet returned when the ACCEPT REQUEST step is completed.

When receiving the packet, the work flow system checks the routing information. Since the routing information contains all true in the example, the current step is routed to all the following steps.

When REVIEW 1 enters the "ready" state, a notification is sent to the person in charge of REVIEW 1. The comment entered by the person in charge of ACCEPT REQUEST is written in the notification (see FIG. 41).

The person in charge of REVIEW 1 reads the notification and declares the starting. At the time, since a rule is defined for the REVIEW 1 step as shown in FIG. 27, the work flow system executes the rule before transmitting the packet to the person in charge. As a result, a vote field VOTE RESULT is added to the packet sent to the person in charge, as shown in FIG. 42.

Upon completion of the rule execution, the work flow system sends the packet shown in FIG. 42. The packet contains the drawing added by the person in charge of ACCEPT REQUEST. Since the REVIEW 1 step is followed only by one step, the routing information is null. That is, the person in charge of the REVIEW 1 step cannot specify routing.

The person in charge of the REVIEW 1 step checks the received drawing and design change request in accordance with the comment from the person in charge of the ACCEPT REQUEST step, determines whether or not the design change should be actually made, and enters yes or no in the VOTE RESULT field in the packet as his or her decision. For example, assume that the person in charge of the REVIEW 1 step enters yes and describes a given comment, the packet becomes as shown in FIG. 43.

The person in charge of the REVIEW 1 step then sends a job completion signal together with the packet containing his or her opinion (FIG. 43) to the work flow system. At the time, if the REVIEW 2 and REVIEW 3 steps are not yet completed, the work flow system only sets a start flag for the next step ACCEPTANCE? in routing postprocessing, and terminates the process.

At the time, since the "complete" rule is also defined for the REVIEW 1 step as shown in FIG. 28, the rule is executed. As a result, the VOTE RESULT field is yes, thus variable $vote is incremented. Resultantly, the value of the variable $vote is set to one.

The operation of the REVIEW 2 step is similar to that of the REVIEW 1; in the example, the person in charge of the REVIEW 2 step does not agree with the design change, enters no in the VOTE RESULT field, and adds a comment. FIG. 44 shows an example of the packet when the REVIEW 2 step is completed.

The person in charge of the REVIEW 2 step then sends a job completion signal together with the packet containing his or her opinion (FIG. 44) to the work flow system. At the time, if the REVIEW 3 step is not yet completed, the work flow system only sets the start flag of the ACCEPTANCE? step (in fact, already set) in the process routine S100 of routing postprocessing shown in FIG. 14, and terminates the process.

The "complete" rule for the REVIEW 2 step is executed. Since the VOTE RESULT field is no, the variable $vote is not incremented and its values remains one.

The operation of the REVIEW 3 step is also similar to that of the REVIEW 1; in the example, the person in charge of the REVIEW 3 step agrees with the design change, enters yes in the VOTE RESULT field, and adds a comment.

When the job is completed, the person in charge of the REVIEW 3 step then sends a job completion signal together with the packet containing his or her opinion to the work flow system. Since all reviews are completed, the ACCEPTANCE? step can be started. That is, the work flow system places the ACCEPTANCE? step in the "ready" state rather than the "isolation" state in routing postprocessing because the start flag is set.

The "complete" rule for the REVIEW 3 step is executed. Since the VOTE RESULT field is yes, the variable $vote is incremented and its values is set to two.

The ACCEPTANCE? step is an automatic execution step in the example. As shown in FIG. 21, a script for totalizing the vote results in the three steps REVIEW 1, REVIEW 2, and REVIEW 3 and changing the routing in response to the total is predefined in the example.

As described above, the script defined here is to totalize the vote results returned from the upstream reviewers and decide by a majority vote, wherein if the number of votes for the design change (yes) is greater than that of votes against it (no), routing to the REJECT REQUEST step is skipped and the current step is routed to the CHANGE DESIGN step; in contrast, if the latter is greater than the former, the current step is routed to the REJECT REQUEST step and not to the CHANGE DESIGN step.

Specifically, the value of the variable $vote set according to the rule executed when the step state of each reviewer is "complete" is referenced, and if the value is equal to or greater than two, the truth value in the routing information field for the CHANGE DESIGN step is set to "true" and that for the REJECT REQUEST step is set to "false." In contrast, if the value of the variable $vote is less than two, the truth value in the routing information field for the CHANGE DESIGN step is set to "false" and that for the REJECT REQUEST step is set to "true."

Since the value of the variable $vote is two in the example, the truth value in the routing information field for the CHANGE DESIGN step is set to "true" and that for the REJECT REQUEST step is set to "false."

Upon completion of the script execution, the ACCEPTANCE? step is completed and enters the "complete" state. Then, the routing postprocessing routine S100 shown in FIG. 14 is executed and the truth values in the routing information field are referenced, thereby obtaining the routing result as on the script for the ACCEPTANCE? step. That is, in the example, the CHANGE DESIGN step enters the "ready" state and the REJECT REQUEST step enters the "isolation" state.

In the example, the person in charge of the CHANGE DESIGN step divides his or her job into steps and starts a subflow including the steps. That is, the person in charge of design change selects a subflow most suitable for making the requested design change or defines a new subflow and starts it as a subflow of the current work flow being executed. The CHANGE DESIGN step cannot be terminated unless the subflow terminates.

FIG. 45 shows an example of the subflow. The example subflow includes all normal steps. After the START step (S121), the first step is a PREPARE SPECIFICATIONS step (S122) for design change and the person in charge of the step is a design leader. The next step is a DESIGN step (S123) for preparing an actual engineering drawing and the person in charge of the step is a designer. The next step is the last step, a CHECK DRAWING step (S124) for checking the engineering drawing prepared by the designer. Then the subflow goes to the END step (S125).

The subflow is executed as the work flow described above, and may be managed by the same work flow system; of course, it can also be executed and managed by another work flow system. When the last step of the subflow is completed and a completion signal is given from the person in charge of the last step, the person in charge of design change can complete the CHANGE DESIGN step to which the subflow is linked and send a completion notification to the work flow system. If more than subflow is defined for the step, the job in the step to which the subflows are linked cannot be terminated until all subflows terminate.

In the example, upon completion of his or her started subflow, the person in charge of the CHANGE DESIGN step returns the actually changed drawing to the packet and terminates the job.

In the APPROVE step following the CHANGE DESIGN step, the changed drawing is approved. Specifically, the person in charge affixes his or her approval stamp upon the drawing.

In the next step DISTRIBUTE DESIGN CHANGE, a subflow is started in the embodiment as in the CHANGE DESIGN step, whereby how design change should be distributed can be flexibly determined.

FIG. 46 shows an example of a subflow defined for the DISTRIBUTE DESIGN CHANGE step in the example. The example subflow includes three automatic execution steps executed in parallel. After the START step (S131), the automatic execution step OUTPUT DRAWING (S132) is to print out the drawing on a printer. The automatic execution step STORE (S133) is to store the drawing in a file. The automatic execution step FAX (S134) is to transmit the drawing to predetermined destinations by a facsimile machine. Then, the DISTRIBUTE DESIGN CHANGE step goes to the END step (S135).

Thus, a routine job can be drastically improved by making all subflows started in one step of automatic execution steps.

The work flow system in the example contains a printer, a filing system, and a facsimile machine as hardware for executing the jobs, although the work flow system can also issue a processing request to the hardware devices through a network such as a LAN, of course.

In this case, when the DISTRIBUTE DESIGN CHANGE step enters the "ready" state, immediately it enters the "run" state. When the subflow in FIG. 46 is started, automatically the three automatic execution steps OUTPUT DRAWING, STORE, and FAX are executed in parallel.

Upon completion of the jobs in all the automatic execution steps, the person in charge of the DISTRIBUTE DESIGN CHANGE step, namely, the secretariat outputs a completion notification. Then, the DISTRIBUTE DESIGN CHANGE step enters the "complete" state. On the other hand, the REJECT REQUEST step is in the "isolation" state as described above. The design change work flow is now complete.

When it is determined that the ACCEPTANCE? step is not routed to the CHANGE DESIGN step, the CHANGE DESIGN step enters the "isolation" state and the APPROVE and DISTRIBUTE DESIGN CHANGE steps following the CHANGE DESIGN step are recursively placed in the "isolation" state as described as step S21 of the routing post-processing routine S100 in FIG. 14.

Therefore, when the REJECT REQUEST step is completed and enters the "complete" state, the DISTRIBUTE DESIGN CHANGE step is placed in the "isolation" state. Thus, the design change work flow reaches the end.

As described above, in the design change work flow in the example, the person in charge of the ACCEPT REQUEST step can change the truth values in the routing information field added to the packet for determining whether or not the step is to be routed to each of the subsequent steps REVIEW 1, REVIEW 2, and REVIEW 3. In the example, however, the person in charge determined routing to all of the REVIEW 1, REVIEW 2, and REVIEW 3 steps and therefore did not change the routing information; the default truth values "true" remained unchanged.

In the design change work flow in the example, the ACCEPTANCE? step is made of an automatic execution step in which the vote results entered by the persons in charge of the REVIEW 1, REVIEW 2, and REVIEW 3 steps in the VOTE RESULT field added with the "run" state rule can be totalized for determining routing to the downstream steps depending on the total result according to the script predefining the job contents. That is, determination of comparatively complicated routing wherein operation is performed based on the job contents executed by the persons in charge of the preceding steps is enabled.

Since the person in charge of the CHANGE DESIGN step divides his or her job into steps and starts a subflow for executing the job, it is not necessary to describe the design change process in detail in the main work flow. Since the person in charge can define the started subflow, the work flow can be designed flexibly.

Further, load of a routine task can be drastically improved by making one step of a subflow including all automatic execution steps like the DISTRIBUTE DESIGN CHANGE step.

As described above, the rules are defined as the state of each step and the processing contents (script) of automatic execution steps and executed in the state of each step. Rule execution in routing postprocessing as in the first embodiment is not required. Routing determination by the person in charge and that by the work flow system can be made by executing routing postprocessing as shown in FIG. 14.

If the step in the main work flow to which a subflow is linked is made of an automatic execution step and the job performed in the automatic execution step is executed by software and the subflow is defined for automatic starting by the software, when the current step is routed to the automatic execution step in the main work flow, automatically the subflow is started and the job is executed; the person in charge need not start the subflow.

Although the truth values in the routing information field are rewritten in an automatic execution step for determining routing to the subsequent steps in the examples given above, the routing information field in a packet can also be rewritten in accordance with the rule executed when the step state becomes "ready," "run," or "complete."

According to the first aspect of the invention, an information field for determining whether or not the step is to be routed to its subsequent step is added to a packet of information necessary for a job given to each step, and the added information field contents are used to determine whether or not the step is to be routed to its subsequent step, so that after a work flow branches, which of the subsequent steps the current step is to be routed to can be easily determined.

Since the person in charge of a step can make an entry in the added information field for determining whether or not the step is to be routed to its subsequent step, the request of the person in charge can be reflected in determination as to whether or not the step is to be routed to its subsequent step and the work flow can be changed flexibly as the person in charge requires.

According to the second aspect of the invention, a rule defined for a step is executed, information as to whether or not the step is to be routed to its subsequent step is described in the information field in response to the result, and routing is determined in accordance with the information field description. Thus, the information processing system itself can determine routing reflecting the step execution result. Reference to the information field contents for routing is the same as that by the person in charge; routing determination software can be simplified.

According to the third aspect of the invention, the process result in the preceding step can be evaluated with a predefined rule, etc., for determining whether or not the step is to be routed to the following steps; the step execution result can be reflected in work flow management. For example, the subsequent work flow can be changed in response to quotation calculated in the preceding step. In this case, reference to a special information field for routing is not required.

According to the fourth aspect of the invention, when a work flow branches, a step to which no step is routed is placed in the isolation state indicating that the step is isolated from the work flow for managing the end state of the step, so that the merging of the preceding steps can be performed without a hitch.

According to the fifth aspect of the invention, an automatic execution step executed by a machine without determining any person in charge is defined and the state of the automatic execution step is also managed like the state of a normal step for which the person in charge is defined. Thus, the automatic execution step can be inserted into a work flow as required, improving job efficiency.

According to the sixth aspect of the invention, since the person in charge of each step can define and start a subflow in the step, the step need not be defined in detail when a work flow is defined. The subflow enables the information processing system to cope with various aspects in the work flow containing the subflow more flexibly as compared with the case where all steps are defined in detail.

What is claimed is:

1. An information processing system comprising:
dividing means for dividing a job to be processed into a plurality of working steps including a first working step and a second working step succeeding said first working step;
defining means for defining an order and content of said plurality of working steps;
means for transferring an information packet to locations of each of said plurality of working steps;
selecting means for selecting an information packet transmitted from said first working step location, said information packet containing a process result of said first working step;
adding means for adding an information field to the selected information packet, the information field determining whether or not the first working step process result is to be routed to the second working step locations
and
routing means for determining whether or not said second working step following said first working step is selected to perform based on a content of said information field.

2. An information processing system comprising:
dividing means for dividing a job to be processed into a plurality of working steps including a first working step and succeeding working steps following and directly connecting to said first working step;
defining means for defining an order and content of said plurality of working steps;
means for transferring an information packet to locations of each of said plurality of working steps;
selecting means for selecting said information packet from each of said plurality of working steps locations, said information packet containing a process result of each said working step;
adding means for adding an information field to said information packet transferred to said first working step location, said information field determining whether or not said working steps succeeding and directly connecting to said first working step are selected to be performed;
rule evaluation means for describing job information in said information field by executing a rule defined for said first working step, said job information indicating whether or not job work by any said succeeding working steps is to be performed; and
routing means for determining whether or not job work by any said succeeding working steps is to be performed based on contents of said information field.

3. An information processing system comprising:
dividing means for dividing a job to be processed into a plurality of working steps including a first working step and succeeding working steps following and directly connecting to said first working step;
defining means for defining an order and content of said plurality of working steps;
means for transferring an information packet to locations of said plurality of working steps;
selecting means for selecting said information packet from each said plurality of working step locations, said information packet containing a process result of each said working step;
rule evaluation means for executing a previously defined rule transferred from said first working step location to said succeeding working steps locations, said rule evaluating means executing the previously defined rule using information contained in said information packet from said first working step location when said first step terminates; and
routing means for determining whether or not each of said plurality of succeeding working steps are to be performed based on a result of said rule evaluation means.

4. An information processing system comprising:
dividing means for dividing a job to be processed into a plurality of working steps;
defining means for defining an order and content of said plurality of working steps;
step state management means for managing an end state of each of said plurality of working steps as at least one of a complete state indicating that said working step has completed job work and an isolation state indicating that said working step is isolated from a job flow of working steps; and routing means for starting a working step when preceding working steps enter at least one of said complete state and said isolation state.

5. An information processing system comprising:

dividing means for dividing a job to be processed into a plurality of working steps;

defining means for defining an order and content of said plurality of working steps;

step state management means for managing a state of each of said plurality of working steps as at least one of a ready state indicating that said working step is ready to start, a run state indicating that said working step is being executed, and a complete state indicating that said working step has completed;

determination means for determining whether each of said plurality of working steps is a normal working step executed by a user in charge or an automatic execution step executed under the control of said information processing system without user intervention; and step management means, when said determination means determines that a selected one of said working steps is said normal step, for sending a notification to the user in charge of said selected working step, thereafter placing said selected working step in said run state and upon reception of a completion notification from the user in charge, placing said selected working step in the complete state; and, when said determination means determines that said selected working step is said automatic execution step, the step management means placing said selected working step in said execution state when a state of said automatic execution step becomes said ready state, and placing the state of said automatic execution step in said complete state when said selected working step has completed.

6. A work flow management method of an information processing system comprising the steps of:

dividing a job to be processed into a plurality of working steps;

defining an order and content of said working steps;

starting a subflow of a selected one of said plurality of working steps, said subflow being defined by working units made by subdividing the job and linkage of said selected working step into said working units positioned before and after said selected working step;

terminating the working unit which starts said subflow upon completion of said subflow; and upon completion of said selected working step, starting a next working step to support the job.

* * * * *